(12) United States Patent
Mercer et al.

(10) Patent No.: US 12,506,409 B2
(45) Date of Patent: Dec. 23, 2025

(54) STEP DOWN POWER CONVERTER WITH PRE-DROPOUT CONTROL

(71) Applicant: Renesas Design (UK) Limited, Bourne End (GB)

(72) Inventors: Mark Mercer, Phoenix, AZ (US); John Kesterson, Central Point, OR (US)

(73) Assignee: Renesas Design (UK) Limited, Bourne End (GB)

( * ) Notice: Subject to any disclaimer, the term of this patent is extended or adjusted under 35 U.S.C. 154(b) by 196 days.

(21) Appl. No.: 18/396,104

(22) Filed: Dec. 26, 2023

(65) Prior Publication Data

US 2025/0211110 A1     Jun. 26, 2025

(51) Int. Cl.
*H02M 3/158*     (2006.01)
*H02M 3/157*     (2006.01)

(52) U.S. Cl.
CPC ........... *H02M 3/158* (2013.01); *H02M 3/157* (2013.01)

(58) Field of Classification Search
CPC .............................. H02M 3/157; H02M 3/158
See application file for complete search history.

(56) References Cited

U.S. PATENT DOCUMENTS

| | | | |
|---|---|---|---|
| 9,893,621 B1 * | 2/2018 | Newlin | H03K 7/08 |
| 9,929,653 B1 | 3/2018 | Mercer et al. | |
| 10,090,763 B1 | 10/2018 | Mercer et al. | |
| 10,218,254 B1 | 2/2019 | Neyra et al. | |
| 10,720,839 B1 | 7/2020 | Yamada et al. | |
| 10,998,818 B2 | 5/2021 | Kesterson et al. | |
| 2004/0174152 A1 | 9/2004 | Hwang et al. | |
| 2009/0200995 A1 | 8/2009 | Tran et al. | |
| 2011/0148372 A1 | 6/2011 | Mariani et al. | |
| 2012/0105038 A1 | 5/2012 | Chen et al. | |
| 2013/0342183 A1 | 12/2013 | Fang et al. | |
| 2014/0266117 A1 | 9/2014 | Goncalves et al. | |

(Continued)

FOREIGN PATENT DOCUMENTS

DE     102019219962 A1     2/2021

OTHER PUBLICATIONS

Examination Report issued on DE 102019219962.3 dated Mar. 24, 2021.

(Continued)

*Primary Examiner* — Rafael O De Leon Domenech
(74) *Attorney, Agent, or Firm* — SCULLY, SCOTT, MURPHY & PRESSER, P.C.

(57) ABSTRACT

A step-down converter is presented. The step down converter includes a power stage having at least one phase, each phase comprising an inductor, a driver, and a clock source. The driver drives the power stage in a synchronous mode or in an asynchronous mode of operation with a minimum off time. When the output voltage approaches the input voltage of the converter, a duty cycle of the converter increases up to a value limited by the minimum off time. The clock source generates a first clock signal having a predefined pulse width. The driver generates a first stretchable clock signal having an adjustable pulse width and an adjustable period. Upon transition from the synchronous mode to the asynchronous mode the driver is configured to increase the adjustable pulse width and the period of the first stretchable clock signal.

20 Claims, 26 Drawing Sheets

(56) References Cited

U.S. PATENT DOCUMENTS

| | | | |
|---|---|---|---|
| 2016/0118887 A1* | 4/2016 | Zhang | H02M 7/4837 |
| | | | 323/271 |
| 2019/0081546 A1 | 3/2019 | Hsu et al. | |
| 2019/0190381 A1 | 6/2019 | Chesneau et al. | |
| 2020/0274445 A1 | 8/2020 | Mei et al. | |
| 2021/0044204 A1 | 2/2021 | Kesterson et al. | |

OTHER PUBLICATIONS

Examination Report issued on DE 102019219962.3 dated Jun. 13, 2023.

Decision to Grant on DE 102019219962.3 dated Dec. 1, 2023.

* cited by examiner

STEP DOWN POWER CONVERTER WITH PRE-DROPOUT CONTROL

RELATED APPLICATION

This application is related to U.S. patent application Ser. No. 16/533,691 filed on 6 Aug. 2019, and which is herein incorporated by reference in its entirety.

TECHNICAL FIELD

The present disclosure relates to a step-down converter; and in particular to a step-down converter operable in a synchronous mode and an asynchronous mode. The asynchronous mode may be referred to as pre-drop out (PDO) mode.

BACKGROUND

Buck converters typically employed in chargers are often faced with the situation in which the required output voltage is very near the input voltage. This demands a duty cycle that exceeds that which would easily be accomplished based on a fixed period along with a fixed defined minimum off time.

The duty cycle of buck converters is defined by the ratio of the output voltage to the input voltage. As the duty cycle approaches one, it is conventional for a buck converter (whether multi-level or single-level) to transition from a synchronous mode of operation to an asynchronous mode of operation. In a synchronous mode of operation, the cycling on of the power switch(es) is synchronous with a system clock signal. But the on-time for a switching state is followed by a minimum off-time for that switching state. During low dropout operation in which the input voltage is only slightly higher than the output voltage, synchronous operation is constrained by the minimum off-time from pushing the duty cycle towards 100%. The maximum switching state on-time established by the system clock signal minus the minimum off-time limits the achievable duty cycle during synchronous operation.

To increase the duty cycle for low dropout operation, it is conventional to transition the buck converter into an asynchronous mode of operation in which the switching states are not switched on synchronously with the system clock signal. The on-time for a switching state may thus increase as it is no longer tethered to the system clock signal period. The achievable duty cycle can thus be increased through asynchronous operation.

Although asynchronous operation is thus advantageous, the buck converter must transition back into synchronous operation as the duty cycle lowers.

A fixed frequency can be chosen to optimize efficiency over the range of expected operating conditions including input and output voltage requirements as well as expected dynamic load range. This is true both for the simple buck converter as well as for the hybrid converters. The multi-level converters are a sub-set of the hybrid converters. Early methods to accomplish this include lowering the switching frequency in a stepwise manner when the need arises. With a longer period, a higher duty cycle is possible even with a minimum off time constraint. In U.S. Pat. No. 10,998,818B2 a method is presented to allow a smooth transition into and out of asynchronous mode such that the period naturally extends to maintain the needed duty cycle which allowed for an arbitrarily long period, which allows for a duty cycle approaching unity.

However, in order to maintain regulation of the output voltage during the transition, the circuit proposed in U.S. Pat. No. 10,998,818B2 uses a cycle timer. This increases the complexity and the footprint of the system. It is an object of the disclosure to address one or more of the above mentioned limitations.

SUMMARY

According to a first aspect of the disclosure, there is provided a step-down converter configured to receive an input voltage and provide an output voltage, the step-down converter comprising a power stage having at least one phase, each phase comprising an inductor; a driver configured to drive the power stage in a synchronous mode or in an asynchronous mode of operation with a minimum off-time; wherein when the output voltage approaches the input voltage, a duty cycle of the converter increases up to a value limited by the minimum off-time; a clock source configured to generate a first clock signal having a predefined pulse width; wherein the driver is configured to generate a first stretchable clock signal having an adjustable pulse width and an adjustable period; wherein upon transition from the synchronous mode to the asynchronous mode the driver is configured to increase the adjustable pulse width and the period of the first stretchable clock signal.

Optionally, the driver comprises a first state machine configured to generate the first stretchable clock signal and adjust the pulse width and period of the first stretchable clock signal.

Optionally, the first clock signal and the first stretchable clock signal are in phase.

Optionally, the step-down converter comprises a first ramp generator configured to generate a first ramp signal responsive to the first clock signal; and an error comparator configured to generate an error signal by comparing the output voltage with a reference voltage; wherein the pulse width of the stretchable clock signal increases as the error signal increases up to a limit value.

For instance, the limit value may be set by a threshold value of the first ramp signal. The threshold value of the first ramp signal is an upper value indicating high far the ramp signal is allowed to increase.

Optionally, the step-down converter comprises a first comparator configured to compare the first ramp signal with the error signal, and wherein when the first ramp signal increases to become equal to the error signal the comparator trips and its output goes high.

Optionally, if the first clock signal occurs before the comparator trip event, then the converter transits to the asynchronous mode, otherwise the converter remains in the synchronous mode.

Optionally, the first state machine is configured to generate a first ramp reset signal to reset a first ramp signal; a first asynchronous mode signal indicating that the converter has transitioned into asynchronous mode; a first minimum off-time trigger signal configured to trigger a start of a timer; and a first magnetization request signal configured to start inductor magnetization after completion of the timer.

Optionally, the step-down converter comprises a first logic circuit coupled to the first state machine.

Optionally, the first logic circuit comprises a plurality of persistence latches.

For instance, the persistence latches may include one or more wait cells and/or one or more arbiters.

Optionally, the step-down converter comprises a second state machine coupled to a second logic circuit; the second state machine being configured to generate a second stretchable clock signal having an adjustable pulse width and an adjustable period.

Optionally, the first logic circuit and the second logic circuit are configured to receive a logic signal for setting the state machine as a master or as a slave, such that when the first state machine is a master, the second state machine is a slave, and conversely when the first state machine is a slave, the second state machine is a master.

Optionally, the step-down converter comprises a second ramp generator; wherein the second state machine is configured to generate a second ramp reset signal to reset the second ramp signal.

Optionally, the second state machine is configured to generate a second asynchronous mode signal indicating that the converter has transitioned into asynchronous mode; a second minimum off-time trigger signal configured to trigger a start of a timer; and a second magnetization request signal configured to start inductor magnetization after completion of the timer.

Optionally, the step-down converter comprises a minimum off-time timer configured to start upon receipt of a trigger signal.

For instance, the minimum off-time timer may comprise a constant current on capacitor timer.

According to a second aspect of the disclosure, there is provided a method of controlling a step-down converter configured to receive an input voltage and provide an output voltage, the method comprising
providing a driver configured to drive a power stage of the converter in a synchronous mode or in an asynchronous mode of operation with a minimum off-time; wherein when the output voltage approaches the input voltage, a duty cycle of the converter increases up to a value limited by the minimum off-time;
generating a first clock signal having a predefined pulse width;
generating a first stretchable clock signal having an adjustable pulse width and an adjustable period; and
upon transition from the synchronous mode to the asynchronous mode, increasing the adjustable pulse width and the adjustable period of the stretchable clock signal.

Optionally, the method comprises generating a first ramp signal responsive to the first clock signal; generating an error signal by comparing the output voltage with a reference voltage; wherein the pulse width of the stretchable clock signal increases as the error signal increases up to a limit value.

Optionally, the method comprises generating an enabling signal to enable a transition between the synchronous mode of operation to the asynchronous mode of operation.

Optionally, the method comprises generating a magnetization request signal to magnetize the inductor.

Optionally, a magnetization of the inductor is caused by expiry of a minimum off-time timer.

According to a third aspect of the disclosure there is provided a controller for use with a step-down converter, the controller comprising a driver configured to drive a power stage of the converter in a synchronous mode or in an asynchronous mode of operation with a minimum off-time; wherein when the output voltage approaches the input voltage, a duty cycle of the converter increases up to a value limited by the minimum off-time; a clock source configured to generate a first clock signal having a predefined pulse width; wherein the driver is configured to generate a first stretchable clock signal having an adjustable pulse width and an adjustable period; wherein upon transition from the synchronous mode to the asynchronous mode the driver is configured to increase the adjustable pulse width and the period of the first stretchable clock signal.

DESCRIPTION OF THE DRAWINGS

The disclosure is described in further detail below by way of example and with reference to the accompanying drawings, in which.

DESCRIPTION

A power converter may operate in different modes including a Pulse Width Modulation (PWM) mode, and an Asynchronous Pre-Drop Out Mode, or simply Pre-Drop Out (PDO) Mode. In the PWM mode, the switching activity of the power switches is controlled by a synchronous clock. In the PDO mode, the on time of the power switches is regulated by a loop and the off time is a fixed value, allowing for an arbitrarily long period which allows for a duty cycle approaching unity. Therefore, the switching activity is no longer controlled by a synchronous clock.

Figure 1:
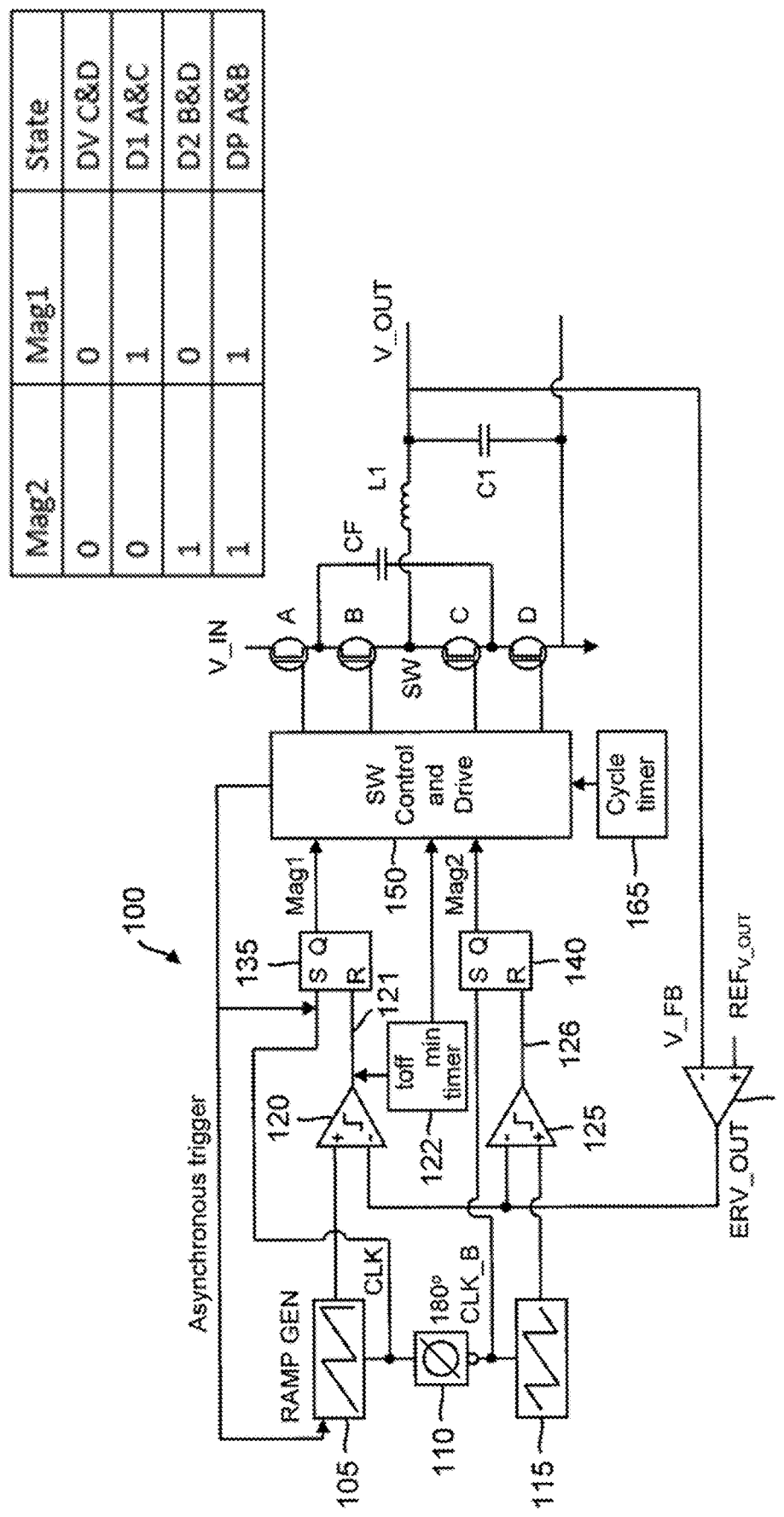
FIG. 1 is a diagram of a power converter as described in U.S. Pat. No. 10,998,818B2.

FIG. 1 is a diagram of a multi-level buck converter configured to transition between synchronous and asynchronous modes during low dropout operation as described in U.S. Pat. No. 10,998,818B2.

The multi-level buck converter 100 regulates output power in transitions between synchronous and asynchronous modes of operation.

The multi-level buck converter 100 includes switch transistors A, B, C, and D arranged in a conventional fashion. In particular, switch transistor A has a first terminal connected to a node for an input voltage V_IN and a second terminal connected to a first terminal for a flying capacitor CF. In addition, the second terminal for switch transistor A connects to a first terminal for switch transistor B. As used herein, a transistor "terminal" refers to, for example, a drain or source terminal for a MOS field-effect-transistor. A second terminal for switch transistor B connects to a switch (SW) terminal for an inductor L1 that connects to an output capacitor C1 for smoothing an output voltage V_OUT. Switch transistor C has a first terminal connected to the SW node (the input node for inductor L1) and a second terminal connected to a remaining terminal for the flying capacitor CF. In addition, the second terminal for switch transistor C connects to a first terminal of switch transistor D that in turn has a second terminal connected to ground.

An error amplifier 130 generates an error signal voltage (ERV_OUT) responsive to a difference between the output voltage and a reference voltage (REFv_OUT). The error signal is compared to two ramp signals that are 180° out of phase with each other (note that other phase relationships may be used in alternative embodiments). A first ramp generator 105 generates a first ramp signal responsive to a clock signal (CLK) from a clock source 110. A second ramp generator 115 generates a second ramp signal responsive to an inverted clock signal (CKL_B) from clock source 110. The second ramp signal is thus 180° out of phase with the first ramp signal. A first comparator 120 compares the first ramp signal to the error signal to generate a first control signal 121. Similarly, a second comparator 125 compares the second ramp signal to the error signal to generate a second control signal 126.

During synchronous operation in which the error signal is not too large, a rising edge for the clock signal CLK sets a reset-set (RS) latch 135 to assert a first magnetizing signal (MAG 1). The rising edge for the clock signal CLK also triggers first ramp generator 105 to begin ramping the first ramp signal. Once the first ramp signal rises to equal the error voltage, first control signal 121 resets RS latch 135 to reset (discharge) the first magnetizing signal. In synchronous operation, a rising edge for the complement clock signal CLK_B sets an RS latch 140 to assert a second magnetizing signal (MAG 2). The rising edge for the complement clock signal also triggers second ramp generator 115 to begin ramping the second ramp signal. Once the second ramp signal rises to equal the error voltage, second control signal 126 resets RS latch 140 to reset (discharge) the second magnetizing signal.

A switch controller and drive circuit 150 processes the first and second magnetizing signals to determine the switching states during synchronous operation. For brevity, switch controller and drive circuit 150 is referred to simply as a switch controller 150 in the following discussion. Switch transistors A, B, C, and D may be configured into one of four switching states designated herein as a D1 switching state, a D2 switching state, a DV switching state, and a DP switching state (See FIG. 1 inset). Switch transistors A and C are on and switch transistors B and D are off in switching state D1. In switching state DV, only switch transistors C and D are on. In switching state D2, it is just switch transistors B and D that are on. Finally, it is just switch transistors A and B that are on in switching state DP.

The switch controller and drive circuit 150 interprets the Mag1 and Mag2 signals and creates the sequence. The High Conversion Rate (HCR) sequence is DP/D1/DP/D2 where DP is magnetizing and D1 and D2 are two different paths used for demagnetization. The Low Conversion Rate (LCR) sequence is D1/DV/D2/DV where D1 and D2 are two different paths of magnetization while DV is the demagnetization. Therefore, D1 and D2 can either be magnetizing (if in LCR) or demagnetizing (if in HCR). The choice of whether to make a D1, D2, or a DP out of a magnetization signal is decided inside the block 150 based on the overlap conditions of the two mag signals. If they overlap, they create a DP. If they underlap (neither is true) then a DV is created. If one is there and not the other, then D1 is there for Mag1 and D2 is there for Mag2.

Synchronous operation depends upon the duty cycle, which in turn determines whether the error signal is less than 50% or greater than 50% of a mid-point of the peak voltage for the two ramp signals (one-half of the peak voltage). As the error signal rises, the on-time for the D1 switching state approaches the period for the clock signal. But there is a minimum off-time that prevents the first magnetizing signal from having an on-time that equals the clock period. Should the on-time for first control signal 121 from comparator 120 exceed the clock signal period minus the minimum off-time, first control signal 121 is reset even through the first ramp signal has not yet risen to equal the error signal. A minimum off-time timer 122 times the minimum off-time period. For example, minimum off-time timer 122 may be formed by shifting the clock signal by the minimum off-time period. In such an embodiment, minimum off-time timer 122 would assert the shifted clock signal at the beginning of the minimum off-time period prior to the assertion of the clock signal.

Switch controller 150 monitors whether the first magnetizing signal had to be reset due to the minimum off-time requirement to determine whether to transition from synchronous operation to an asynchronous mode of operation in which there is a relatively small dropout between the input voltage and the output voltage. In one embodiment, switch controller 150 counts whether the number of consecutive cycles for the clock signal in which the first magnetizing signal was reset due to the minimum off-time requirement. For example, switch controller 150 may transition to an asynchronous mode of operation when the count equals four.

Regardless of how the transition to asynchronous mode is triggered, the beginning of the on-time for the magnetization signals is no longer synchronous with the clock signals. During asynchronous operation, switch controller 150 asserts an asynchronous trigger signal to trigger first ramp generator to begin ramping the first ramp signal and to set RS latch 135 to set the first magnetizing signal. The first magnetizing signal is reset during asynchronous mode only when the first ramp signal has risen to equal the error signal even though the resulting on-time for the first magnetization signal may exceed the clock signal period. Once the first magnetizing signal is reset, it is maintained off for the minimum off-time and then the first ramp signal is triggered by the asynchronous trigger signal to begin ramping again while the first magnetizing signal is set. Both the first ramping signal and the first magnetizing signal are thus untethered from the clock signal during asynchronous operation. Assertion and de-assertion of the second magnetizing signal is analogous during asynchronous mode as will be explained further herein.

Asynchronous operation thus allows the first magnetizing signal to have an on-time that is sufficiently long so that the output voltage can be maintained at a desired level despite there being a relatively small dropout between the output voltage and the input voltage. But once the duty cycle begins to fall, switch controller 150 must transition back into synchronous operation. A conventional transition from asynchronous to synchronous operation typically results in a significant perturbation of the output voltage. To prevent this perturbation and maintain regulation of the output voltage during the transition, switch controller 150 uses a cycle timer 165 that times a cycle timer period that is shorter that the clock signal period.

Figure 2:
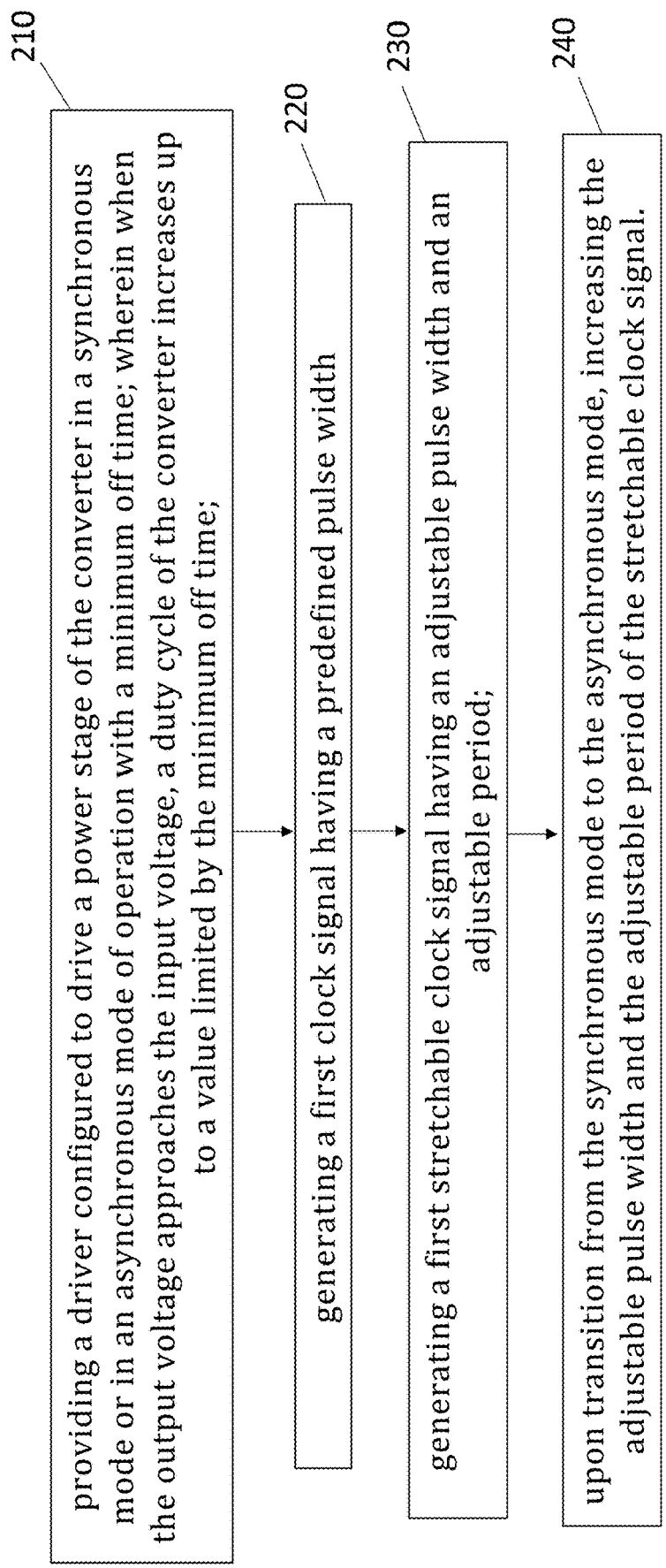
FIG. 2 is a flow chart of a method for controlling a step-down converter according to the disclosure.

FIG. 2 is a flow chart of a method for controlling a step-down converter according to the disclosure. The step-down converter may include one or more phases, each phase comprising an inductor. Each phase may include a high side power switch coupled to a low side power switch at a switching node. It will be appreciated that there could be more than two switches per phase. For instance, each inductor phase may have four switches (See FIG. 1 and FIG. 3A).

At step 210 a driver is provided. The driver is configured to drive a power stage of the converter in a synchronous mode or in an asynchronous mode of operation with a minimum off time. When the output voltage of the converter approaches the input voltage received by the converter, the duty cycle of the converter increases up to a value limited by the minimum off time.

At step 220 a first clock signal having a predefined pulse width is generated. The first clock may be referred to as the first buck clock. At step 230 a first stretchable clock signal having an adjustable pulse width and an adjustable period is generated.

At step 240 the adjustable pulse width and the adjustable period of the stretchable clock signal are increased upon transition from the synchronous mode to the asynchronous mode. The cycle period may be stretched as necessary as the on time is stretched past the normal period boundary as defined by the buck clock.

An error signal may be generated by comparing the output voltage with a reference voltage. The pulse width of the stretchable clock signal increases as the error signal increases up to a limit value. For instance, the limit value may be set by a threshold value of a ramp signal. The threshold value of the ramp signal is an upper value indicating how high the ramp signal is allowed to increase. This also sets a minimum frequency (longest period) that is allowed to get to the desired duty cycle. When this limit is hit then the converter goes from PDO to DO; that is the signal starts to drop out; i.e., fall below regulation.

Figure 3A:
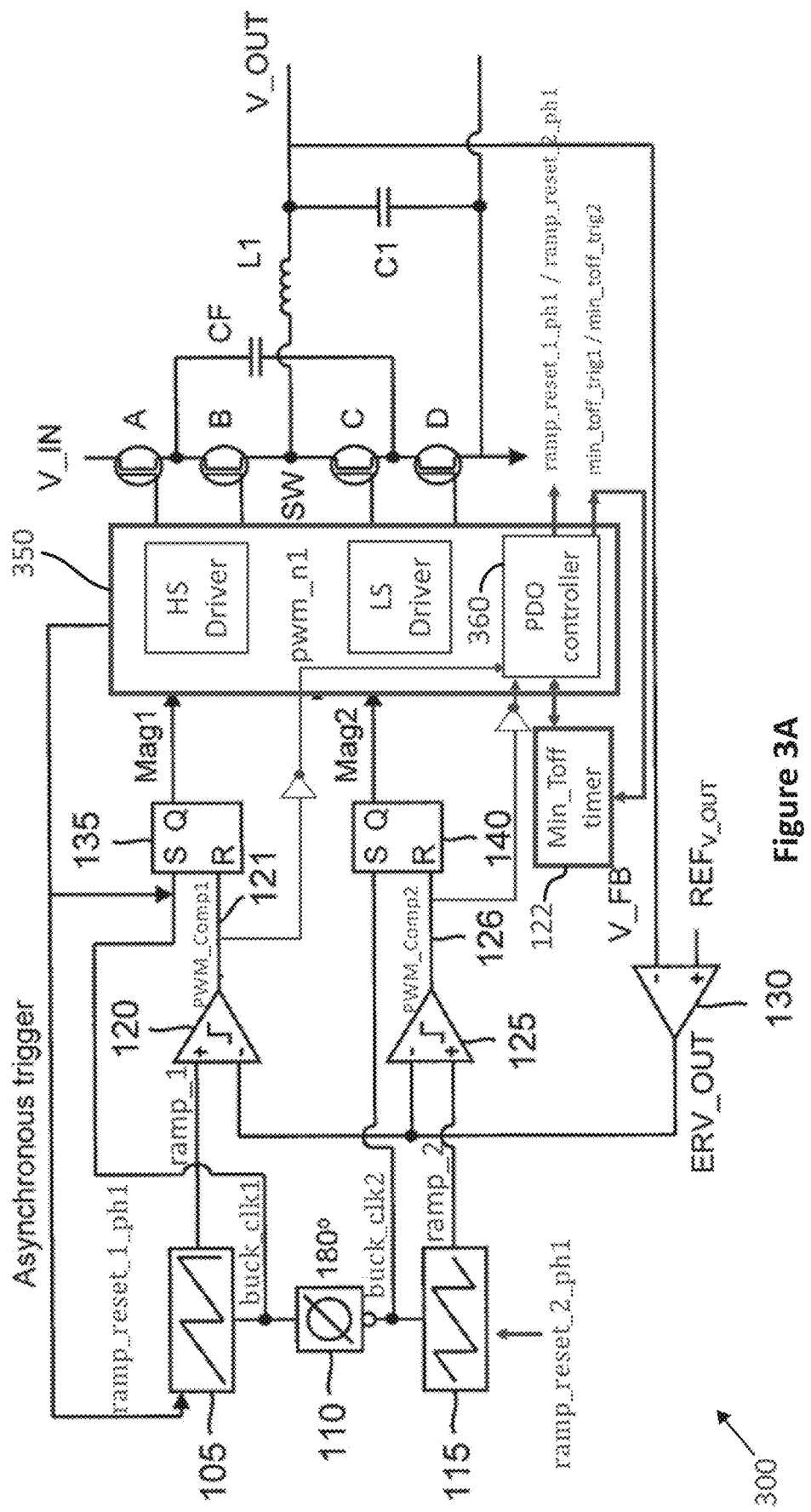
FIG. 3A is a diagram of a power converter for implementing the method of FIG. 2.

FIG. 3A is a diagram of a power converter for implementing the method of FIG. 2. The power converter 300 is similar to the power converter 100 of FIG. 1, and same reference numerals are used to represent corresponding components as described in FIG. 1. Compared with the converter of FIG. 1, the cycle timer 165 has been removed and the block 150 is replaced by a driver 350 that includes a PDO controller 360. Consequently, the power converter can be implemented on smaller die area.

The circuit 300 may be referred to as a hybrid multi-level converter (3 level in this case). The Mag1 signal represent the master signal while the Mag2 signal represents the slave signal. Mag2 maintains a phase relationship with the Mag1 signal of 180 degrees. It will be appreciated that additional phases can be added at different phase angles.

The input S of the (RS) latch 135 may be driven from the clock source 110 (buck_clk1 signal) or from the driver 350 (ramp_reset_1_ph1 signal). In non-PDO operation the latch 135 is driven from clock source and in PDO mode it is driven from the PDO controller 360 within driver 350. The RS latch 135 is also referred to as D1 PWM latch later in FIG. 4.

Figure 3B:
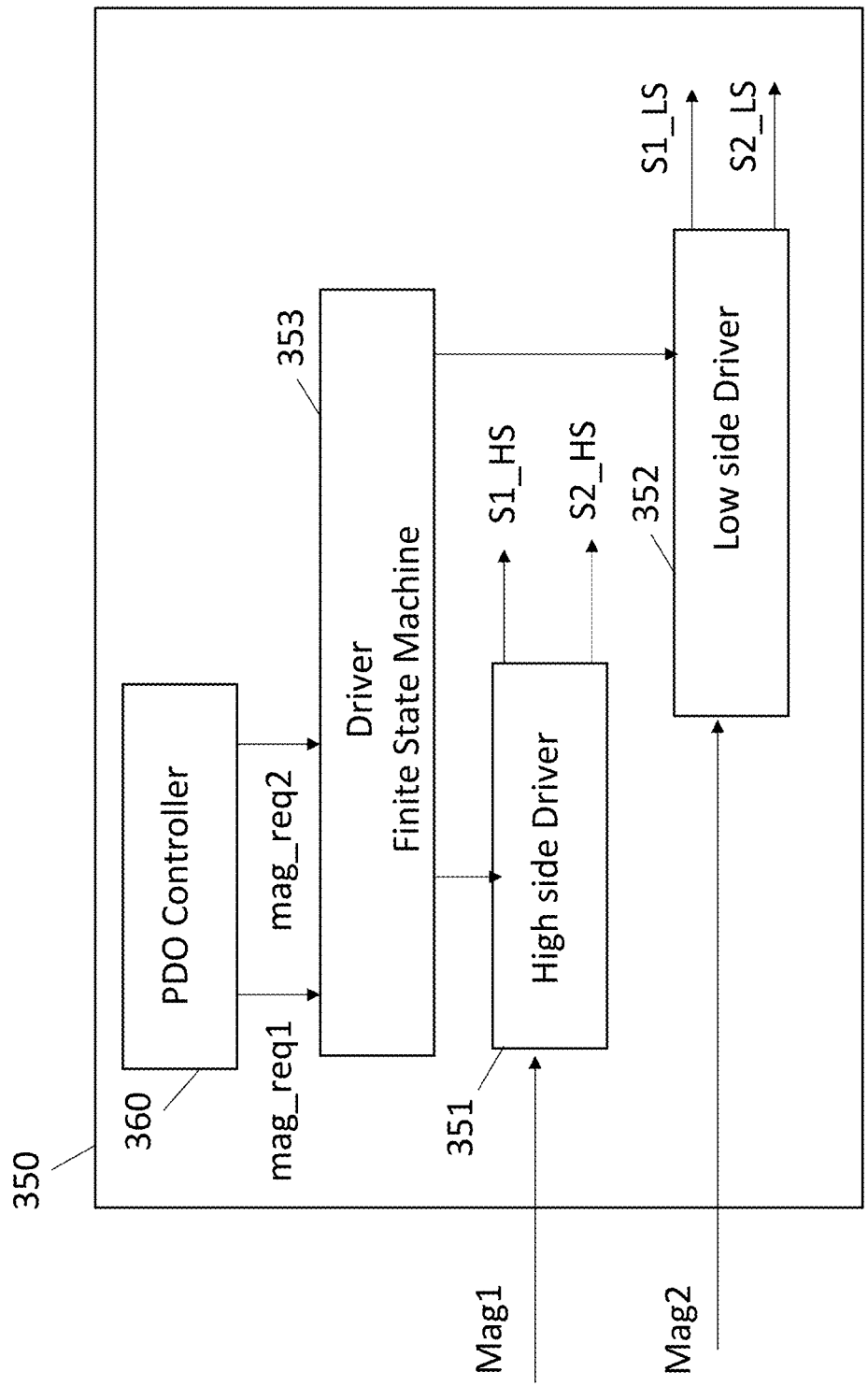
FIG. 3B is a diagram of the driver circuit used in the power converter of FIG. 3A.

FIG. 3B is a diagram of the driver circuit 350 used in the power converter of FIG. 3A. The driver circuit 350 includes a high side driver 351 for driving the high side power switches A and B; and a low side driver 352 for driving the low side power switches C and D. The driver is also provided with a PDO controller 360 and a driver finite state machine 353. The driver state machine controls the high side and low side drivers based on the magnetization signals "mag_req1" and "mag_req2" provided by the PDO controller 360.

Figure 3C:
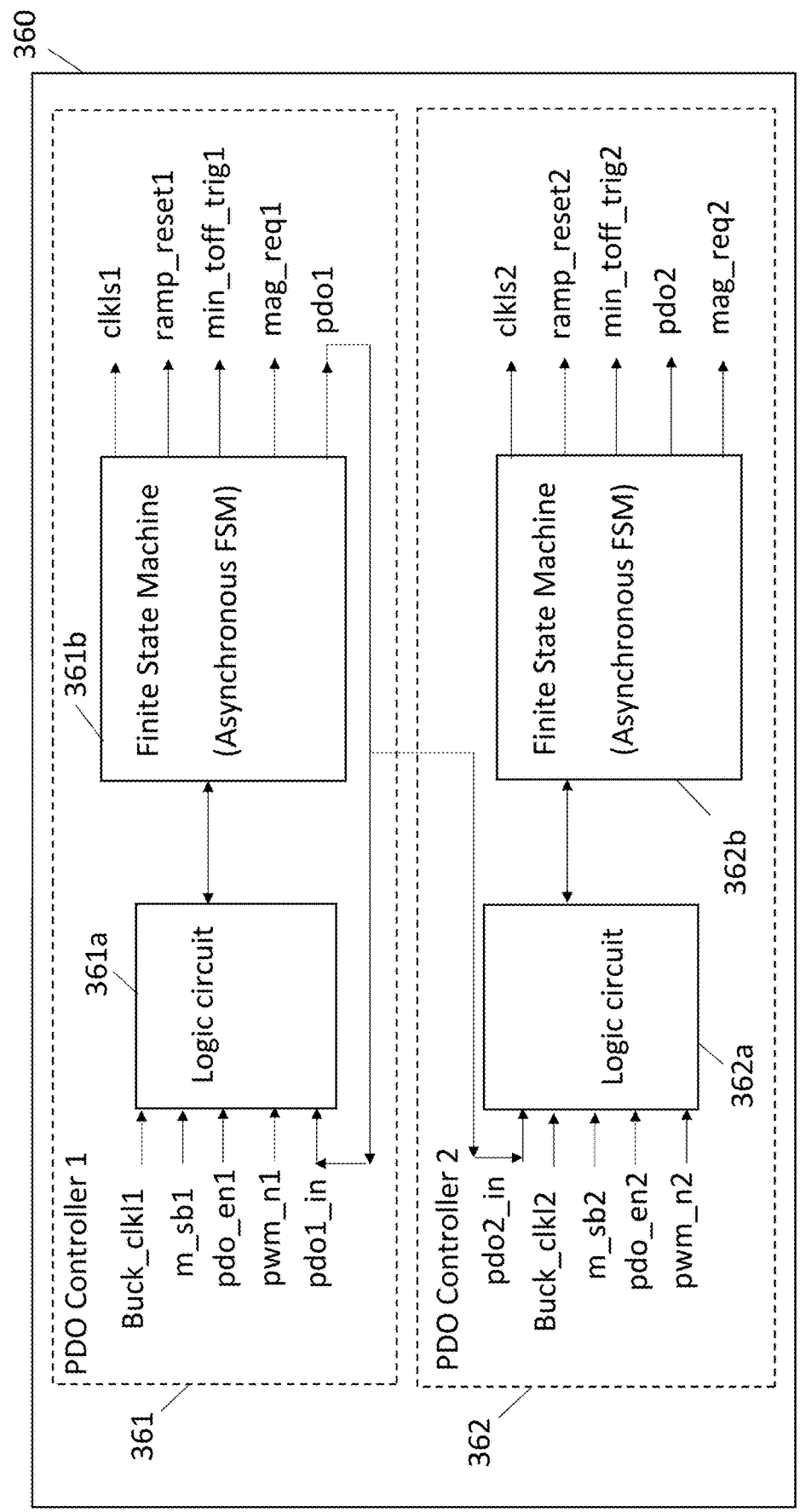
FIG. 3C is a diagram of the PDO controller shown in FIG. 3B.

FIG. 3C is a diagram of the PDO controller 360. The PDO controller 360 includes a first PDO controller 361 (also referred to as first sub PDO controller) for controlling the operation of the first ramp generator 105, and a second PDO controller 362 (second sub PDO controller) for controlling the operation of the second ramp generator 115. The first sub PDO controller includes a logic circuit 361a coupled to a finite state machine (FSM) 361b. Similarly, the second sub PDO controller includes a logic circuit 362a coupled to a finite state machine (FSM) 362b. The first and second controllers 361 and 362 are arranged in the same way.

The logic circuit receives several signals that include the main clock "buck_clk", a master/slave signal "m_sb", an enable signal "pdo_en", a pdo input signal "pdo_in", and a comparator signal "pwm_n" inverted comparator output from the PWM comparator (120/125).

When m_sb is true the controller is a master otherwise it is a slave. When pdo_en is true, the system is allowed to go into pre-dropout mode to accomplish the needed duty cycle. If it is false, the system will not go into pre-dropout mode even if the error amp requests a duty cycle that exceeds what would be possible given the fixed cycle time and the minimum off time. The pdo_in signal comes from the master pdo output to let the slave pdo know that the master is in pdo mode.

The FSM is configured to generate several signals that include the stretched clock signal "clkls"; the ramp reset signal "ramp_reset" used to reset the ramp; the trigger signal "min_toff_trig", the asynchronous mode signal "pdo" indicating that the converter has transitioned into asynchronous mode; and the magnetization request signal "mag_req" configured to start inductor magnetization.

Figure 4:
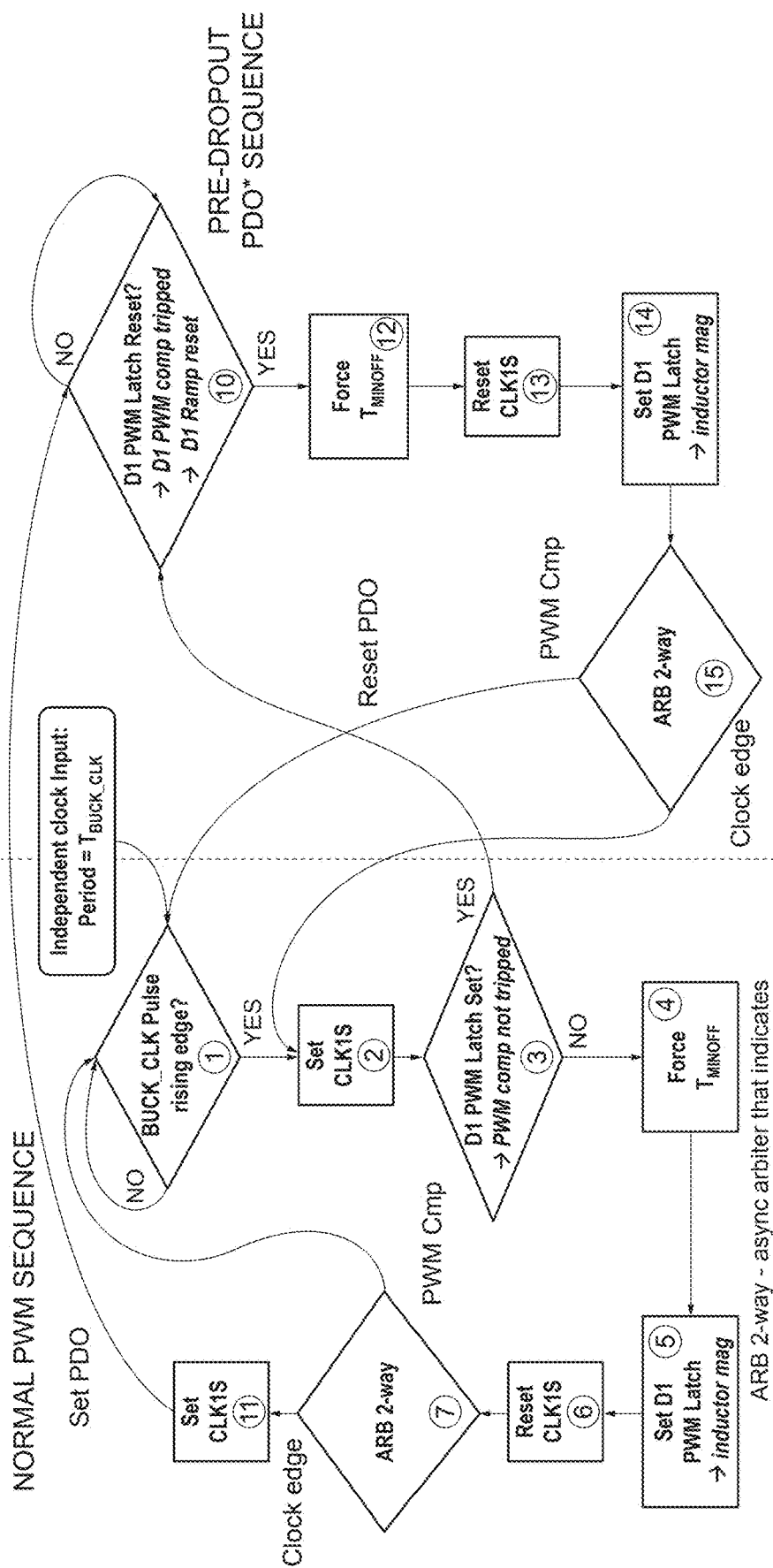
FIG. 4 is a diagram illustrating the operation of the power converter system of FIG. 3A.

FIG. 4 is a diagram illustrating the operation of the power converter of FIG. 3A. Two regions are shown representing operation in the synchronous mode and the asynchronous mode, respectively. In this example the synchronous mode is referred to as the normal PWM sequence, and the asynchronous mode as the pre-drop out sequence. For ease of description, the various states are numbered state 1 to state 15.

The synchronous mode (normal PWM sequence) includes the states 1, 2, 3, 4, 5, 6 and 7. The asynchronous mode (pre-dropout sequence) includes the states 10, 12, 13, 14, 15, 1, 2 and 3. So the states 1, 2, and 3 are overlapping states used in both modes. The state 11 is the transition state from the synchronous mode into the asynchronous mode.

The operation begins with state 1. In state 1, the system (in this instance the state machine) is waiting for the buck clock rising edge. When the rising edge of the clock is detected, a stretched clock "clkls" is asserted true at state 2. Next at state 3, the system evaluates whether the PWM comparator (120/125) has tripped or not. A voltage ramp (from 105/115) starts to ramp up at the point where the magnetization signal (Mag 1/Mag2) is initiated. This is because the Mag1 signal triggers the "ramp_reset" signal. This has not happened yet. The Mag1 signal corresponds to an on time for the buck converter. After the magnetization signal is initiated, the ramp begins to rise. When the ramp exceeds the error amplifier (130) output (ERV_OUT), the PWM comparator (120/125) trips (goes high), hence causing the termination of the PWM on time which is what resets the D1 PWM latch (135/140) in the diagram.

If the D1 PWM latch (135/140) is not set, the system goes to state 4, otherwise it goes to state 10. In state 4, a min_toff timer (122) is triggered (by the min_toff_trig1 signal) and after it has expired the system advances to state 5 in which the PWM latch (135/140) is set, and the inductor magnetization is started. This also causes a reset on the stretched clock clkls as the system progresses through state 6.

Once the inductor magnetization has begun, the system waits in state 7 to determine with an asynchronous arbiter whether the clock occurs first or the PWM comparator trips first. If the PWM comparator trips first, the inductor magnetization is terminated, and the system goes back to state 1, awaiting the next rising edge of the buck clock. Then another cycle of normal operation occurs.

However, if the system is in state 7 where we have just terminated the stretched clock CLK1S and started the inductor magnetization, and if the buck clock edge occurs before the PWM comparator trip event has occurred, then the system advances from state 7 to 11 instead of state 1. This is because the duty cycle is large enough such that the system will need a longer buck clock cycle period to obtain the required duty cycle while still maintaining the minimum off time requirement.

The state 11 sets the stretched clock CLK1s and the advances to state 10. State 11 also sets a pre-dropout (PDO) signal that allows the system to know that it has advanced into pre-dropout mode.

In state 10 the system waits for the completion of the PWM comparator trip. This is because the clock edge occurred before the PWM comparator trip event. Once the PWM comparator has tripped the minimum toff timer is again triggered in state 12 and in state 13 the stretched clock is de-asserted.

As soon as the minimum toff time has expired, the PWM signal is set, and a new inductor magnetization starts immediately at state 14.

The system then advances to state 15. In this state, either a buck clock or a PWM comparator trip could occur and the occurrence of one event or the other will indicate whether the system is to continue in pre-dropout (PDO sequence) or go back to normal PWM sequence.

If the clock edge occurs first the system will advance to state 2 where it will set the clkls stretched pulse. This is likely the direction of exit from state 15 if the system still requires continued pre-drop out operation. But if the PWM comparator trips first, then the state machine goes to state 1 where it will wait for another buck clock before moving forward. In this case the PDO signal is reset, and the system will continue in normal PWM mode.

If the system exited state 15 through the clock edge, then state 2 will set the stretched clock CLK1s signal and will advance to state 3. In this case state 3 will see that the PWM comparator has not tripped and will advance to state 10 again to repeat the pre-drop out cycle.

In summary, the state order for PWM sequence is 1, 2, 3, 4, 5, 6, 7, 1, ... etc. When going into pre-drop out the state order goes from 7 to the following:

States 11, 10, 12, 13, 14, 15, 2, 3, and back to 10. When coming out of PDO, the sequence goes 10, 12, 13, 14, 15, 1, 2, 3, 4, 5, 6, 7, 1, 2 ..., etc.

The proposed step-down converter provides a smooth transition into and out of the "Asynchronous Drop Out Mode" while maintaining a relatively simple design. In particular there is no need for a cycle timer.

Figure 5:
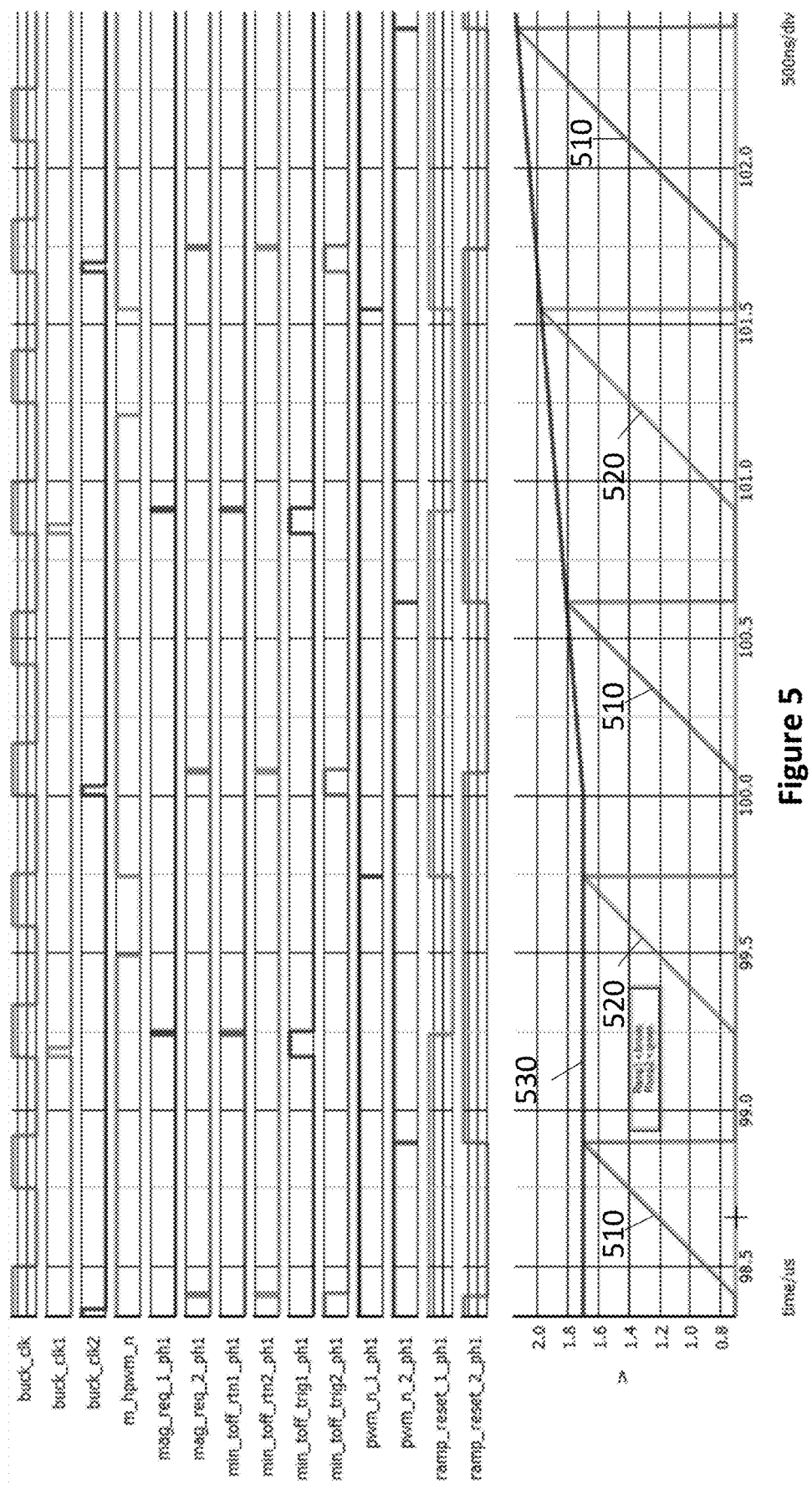
FIG. 5 is a waveform diagram illustrating the interaction of two ramp signals with the magnetization request signals, the PWM peak detects signals, and the buck clock.

FIG. 5 is a waveform diagram showing the following signals:

The buck clock signals, "buck_clk1" and "buck_clk2" generated by clock 110 for the high side and low side respectively.

The magnetization request signals, "mag_req_1_ph1" and "mag_req_2_ph1" generated by the latches 135 and 140 for the high side and low side respectively.

The PWM peak detect signals, "pwm_n_1_ph1" and "pwm_n_2_ph1" generated via the PWM comparators 120 and 125 for the high side and low side respectively.

The ramp reset signals "ramp_reset_1_ph1" and "ramp_reset_2_ph1" generated by the FSMs 361b and 362b, and received by the ramp generators 105 and 115, respectively.

The minimum toff restart signals, "min_toff_trig1_ph1" and "min_toff_trig2_ph1" generated by the state machines 361b and 362b; and the minimum toff return signals, "min_toff_rtn1_ph1" and "min_toff_rtn2_ph1".

Also shown is the "m_hpwm_n" signal—this is a similar signal to pwm_n above, but it indicates that an alternate ramp has exceeded the error amp input.

Also illustrated are the ramp signals ramp_1 510 and ramp_2 520 generated by the ramp generators 105 and 115 respectively, as well as the error amp voltage ERV_OUT 530 from the error amplifier 130.

FIG. 5 shows the interaction of the ramp signals 510 and 520 with the magnetization request signals "mag_req_1_ph1" and "mag_req_2_ph1", the PWM peak detects (pwm_n_1_ph1 and pwm_n_2_ph1), and the buck clock. In the normal synchronous mode which is shown, the buck clock starts a "min_toff_trig" signal. After the minimum off time has expired, the "min_toff_rtn" is asserted. This causes a "mag_req" and "mag_ack" which is not shown. This starts the ramp. When the ramp exceeds the error amp voltage 530, the "pwm_n" signal goes low which will terminate the magnetization and reset the ramp. Two channels of 180 degrees of interleaved phase are shown in the figure. The inverse of the "ramp_reset" signals is effectively the magnetization output.

Figure 6:
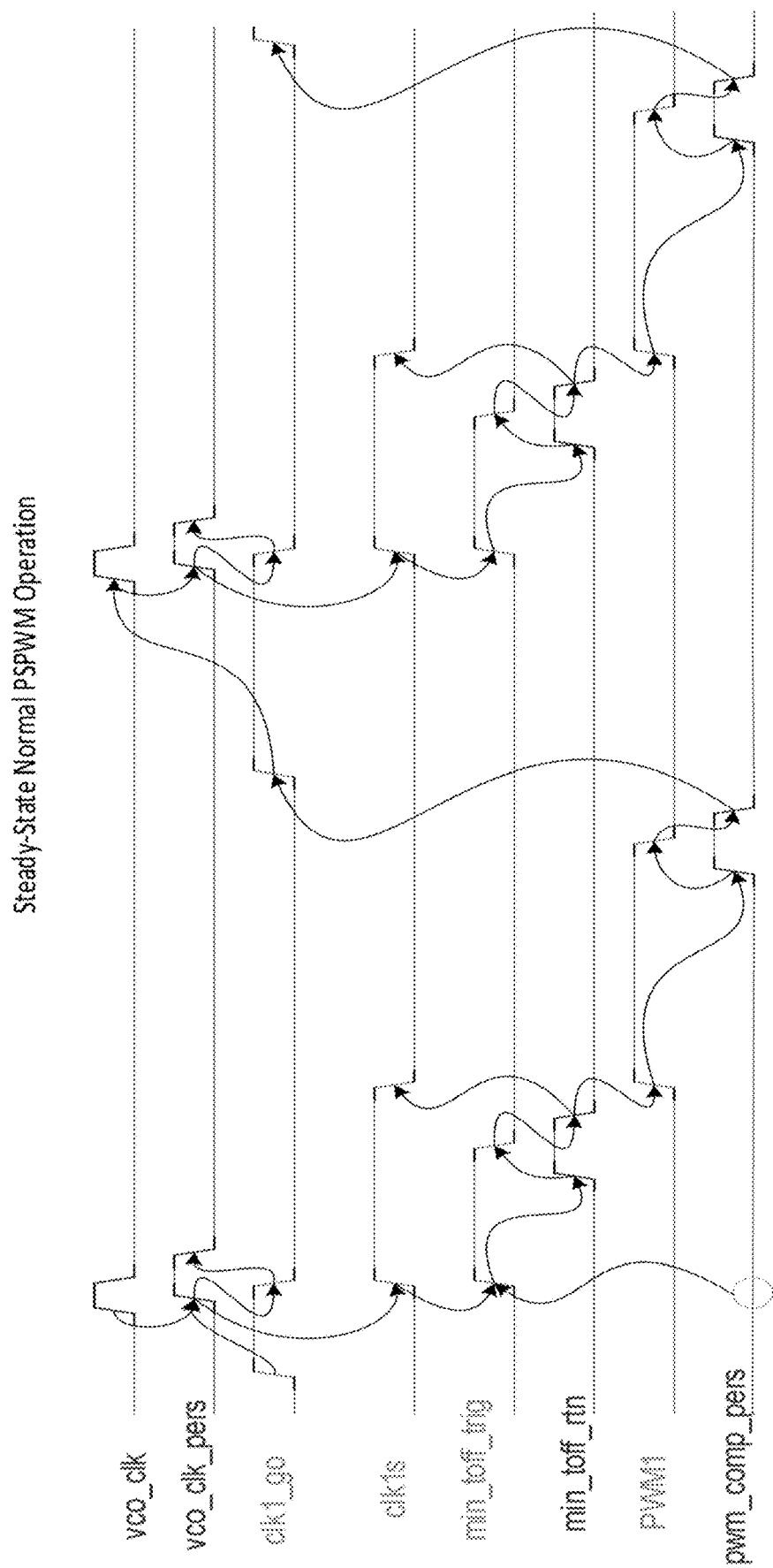
FIG. 6 is a timing diagram showing the steady state operation of PDO control in normal (non-PDO) mode.

FIG. 6 is a timing diagram showing the steady state operation of PDO control in normal (NON-PDO) mode. The arrows represent causality triggered by a rising or a falling edge. The timing diagram shows the buck clock labelled "vco_clk", and a persistent version of the buck clock signal "vco_clk_pers". The persistent signal "vco_clk_pers" is the clock signal "vco_clk" as seen through an asynchronous Wait cell that is controlled by the clk_1_go signal.

Also shown is the stretched clock "clk1s". Its rising edge begins with the buck clock and its falling edge is based on the completion of the minimum off time timer "min_toff_rtn" (see state 4 in FIG. 4). At the rising edge of the clkls stretched clock, the min_toff_trig signal is asserted which is the starting of the minimum off time timer. When that minimum off time is fulfilled the min_toff_rtn signal is sent back from the timer and must also be causally acknowledged by the state machine before it will de-asserted. This works in a similar way as the vco_clk_pers signal did with the wait cell.

The timer expiring also then causes the beginning of the inductor magnetization which is signal labelled PWM1. Once this signal goes true, the ramp begins to ascend in voltage and when it exceeds the error amp threshold the PWM comparator signal will be seen (see FIG. 5) and a persistent version of it called pwm_comp_pers will be seen by the asynchronous state machine. This will cause the termination of the inductor magnetization and we will go back to state 1 where we will again wait for the next buck clock.

Figure 7A:
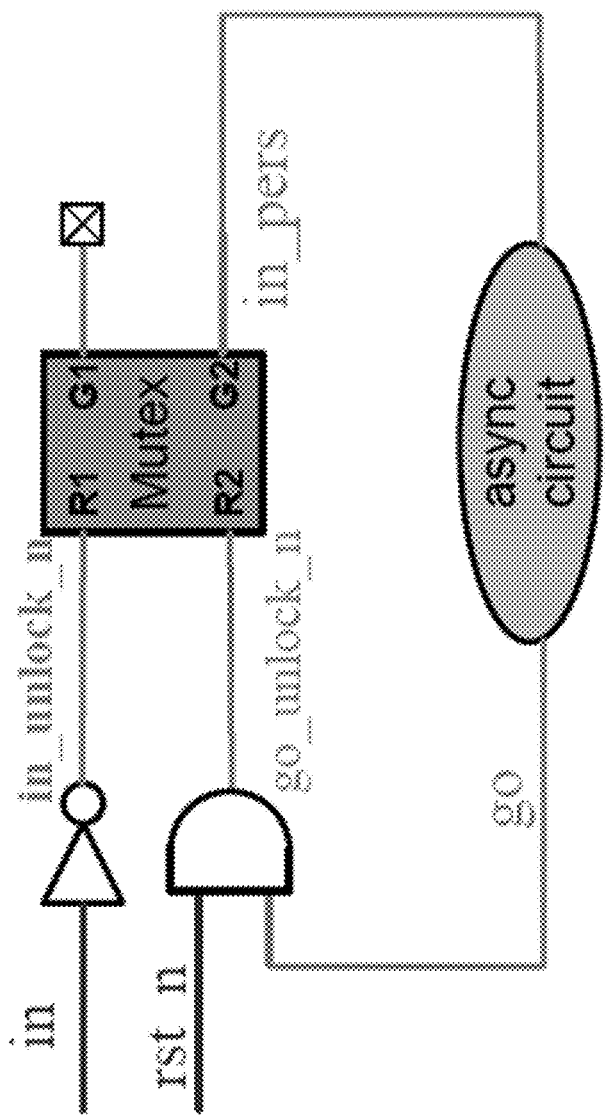
FIG. 7A is a schematic diagram of a wait cell.

FIG. 7A is a schematic diagram of a wait cell. A Wait Cell is also called a persistence latch and is used in asynchronous circuitry to detect a signal and present it to another asynchronous circuit as a persistent signal that will remain there until its existence is causally acknowledged.

The wait cell includes a mutual exclusion (MUTEX) cell having two inputs R1, R2 and two outputs G1, G2. The input R1 receives an input signal "in" via an inverter. The second input R2 is coupled to an AND gate that receives a reset signal rst_n and a go signal from an asynchronous circuit, for instance an asynchronous state machine. The G2 output provides the persistent signal "in_pers" to the asynchronous circuit.

Figure 7B:
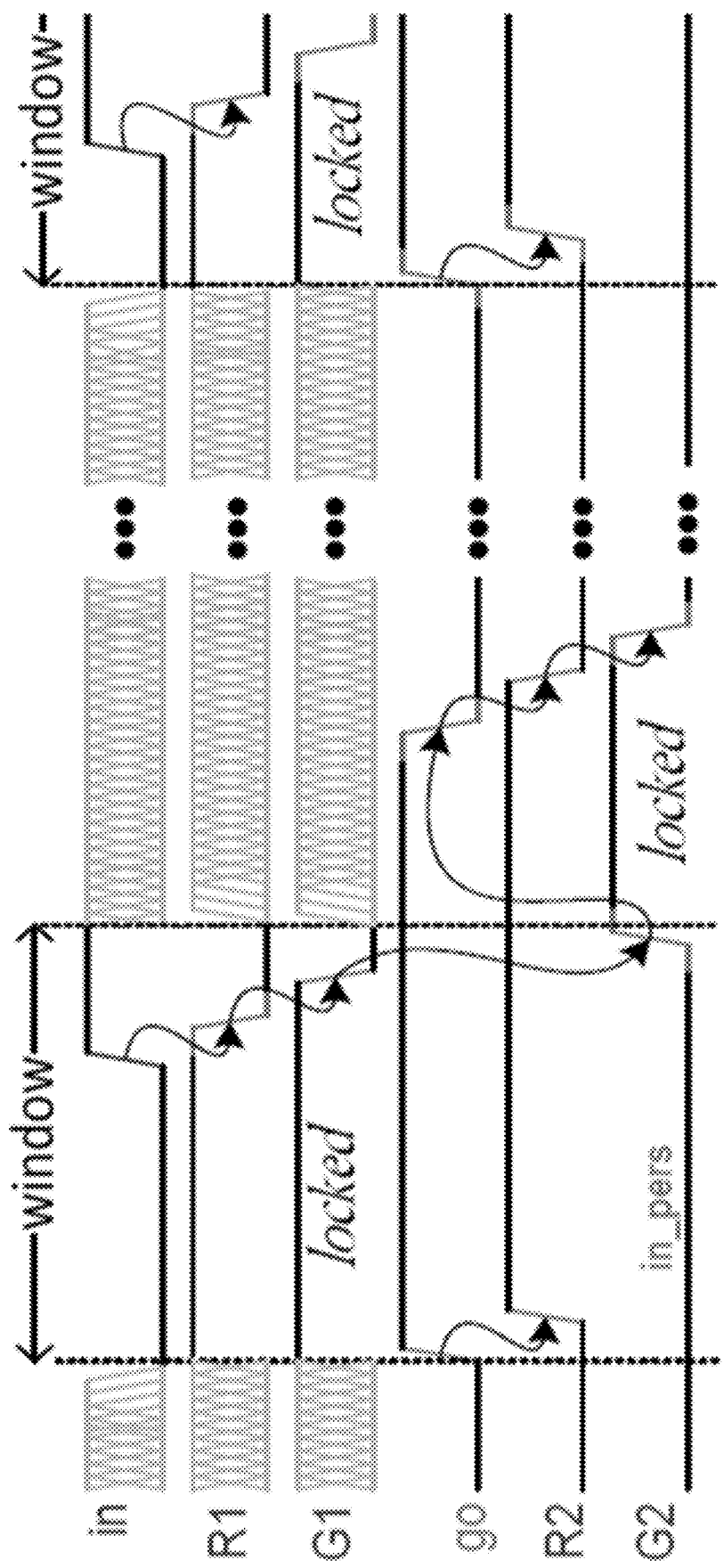
FIG. 7B is a timing diagram illustrating the operation of the wait cell of FIG. 7A.

FIG. 7B is a timing diagram illustrating the operation of the wait cell of FIG. 7A. The asynchronous state machine expects causal acknowledgement of all signals coming into it. It effectively opens a window in time when it is looking for the presence of a signal (called "in" in this case). It does this by asserting the go signal. The MUTEX will allow only a grant 1 (G1) or a grant 2 (G2). If both requests R1 and R2 are high, only the one that arrived first will have its corresponding R1→G1 or R2→G2 grant issued. After the grant is initiated, it will remain true until its request is deasserted. If the "in" signal is low before the go signal, then the R1 input to the mutex is true while the R2 is low and thus the G1 is issued and will remain true until R1 goes away. Then the asynchronous circuit asserts the go signal. Even though R2 is issued, the G2 will not be issued until R1 is deasserted. When "in" goes true, R1 is deasserted which will cause G1 to go off and now R2 being still high will finally cause G2 to go high. Once this happens, it will never turn off until the go signal is deasserted. This forces the persistent version of the signal to remain present for as long as it takes the asynchronous state machine to acknowledge its existence.

Figure 8:
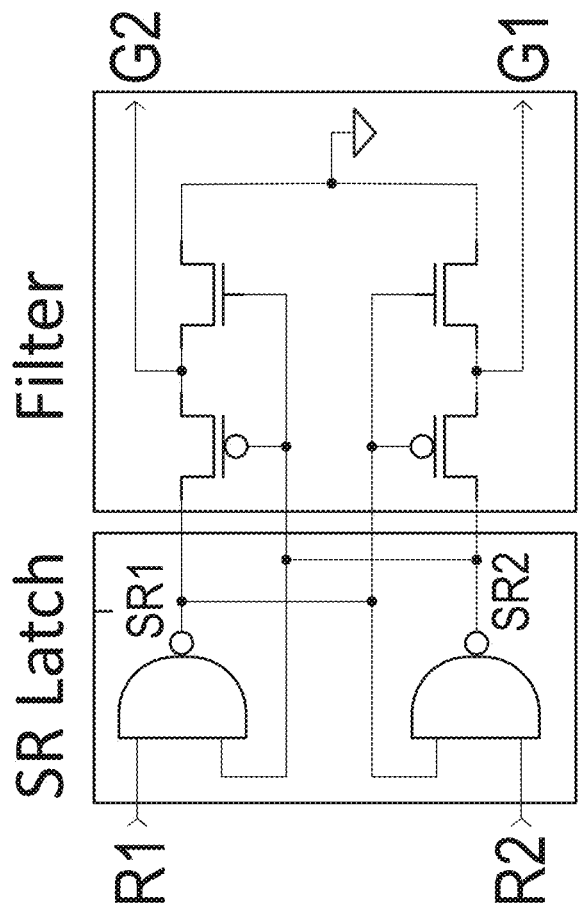
FIG. 8 is an example implementation of a MUTEX element or MUTEX cell.

FIG. 8 is an example implementation of a MUTEX element or MUTEX cell.

The MUTEX cell if formed of an SR latch circuit that receives R1 and R2 coupled to a filter circuit providing G1 and G2. The MUTEX cell is designed to safely decide the order in which two input signal change. The main purpose of the MUTEX element is to capture any metastable event inside of itself not allowing that event to propagate to its output pins. So, if the SR latch goes metastable because both R1 and R2 are asserted within a metastable window time of each other, since the outputs SR1 and SR2 will be at VDD/2, the N-channel FET's in the filter will both be on and the G1 and G2 outputs will both remain low until the metastability is resolved within itself. Only after that time will the winner of the inputs be granted as an output.

Figure 9A:
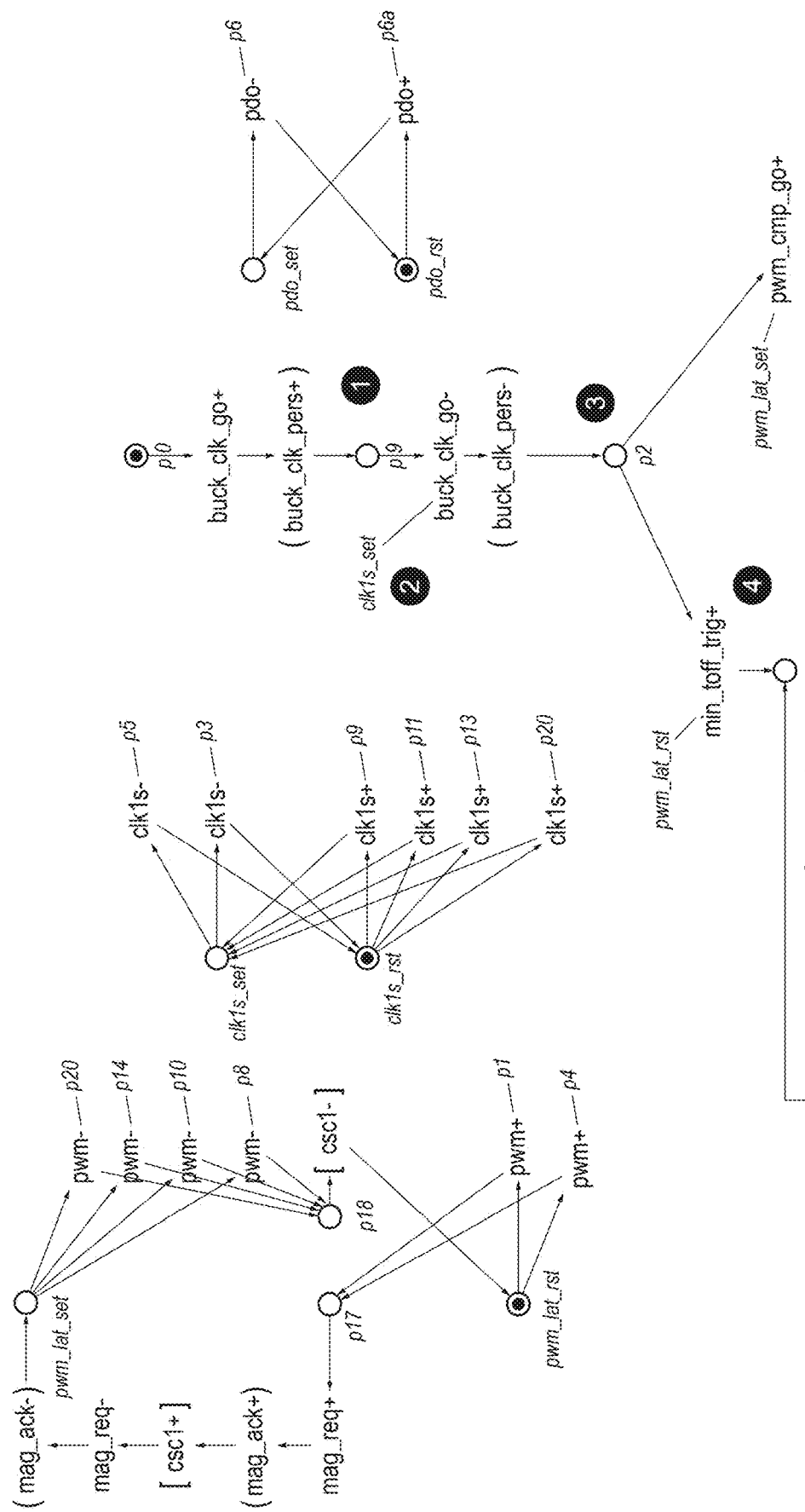
FIGS. 9A, 9B and 9C show a signal transition graph that defines the order of causality of signals in the asynchronous finite state machine.
Figure 9B:
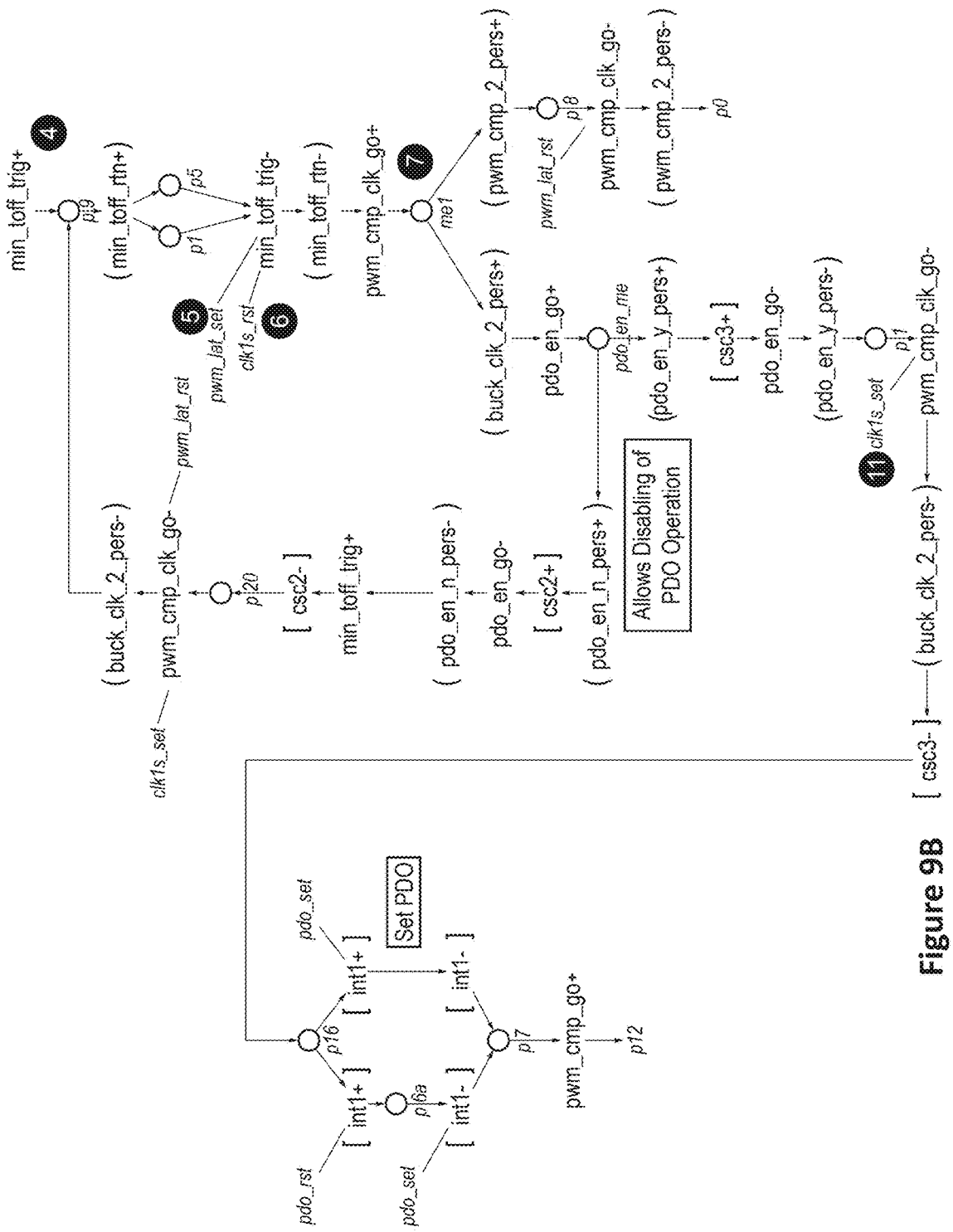
Figure 9C:
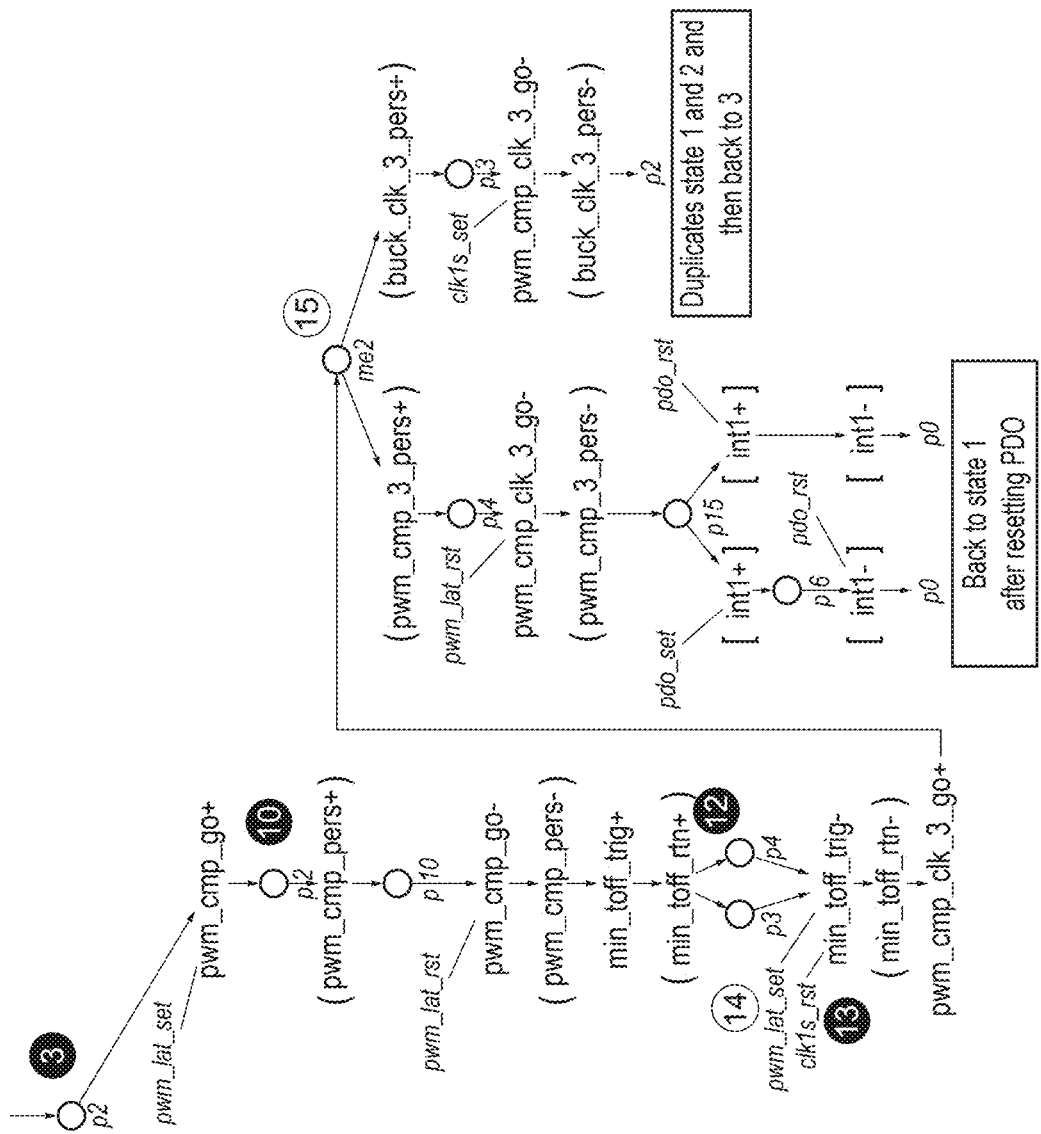

FIGS. 9A, 9B and 9C show a signal transition graph (STG) that defines the order of causality of signals in the asynchronous finite state machine (AFSM). The signals shown between brackets are input signals to the state machine. The other signals are outputs from the state machine. The circled numbers correspond to the state numbers in FIG. 4.

The signals provided between square brackets are internal signals that exist inside the STG and are not brought out. They serve no purpose other than to make the circuit synthesizable as they are used to resolve coding state conflicts. The state variable is the concatenation of the input, output, and internal signals, and without the internals, there are multiple locations in the state machine where the state of all the signals are the same. This gets resolved by adding state bits called internal signals so that every token location presents a unique different state encoding.

The inputs have been processed through a type of persistent latch similar to the wait cell of FIG. 7A, and arbiters, including, two-way arbiters. These devices are a special form of a persistence latch that observes two input signals "sig1" and "sig2" instead of one; and waits for the first one to appear and its corresponding grant is set until it is acknowledged.

Using a tool called Workcraft, this STG is compiled to a logic gate circuit that will enforce the causality of the output signals so long as the input signals (between brackets) obey the causality that is also described by this diagram. The input signals are forced to obey the causality relationships by the use of persistence latches and arbiters.

Figure 10:
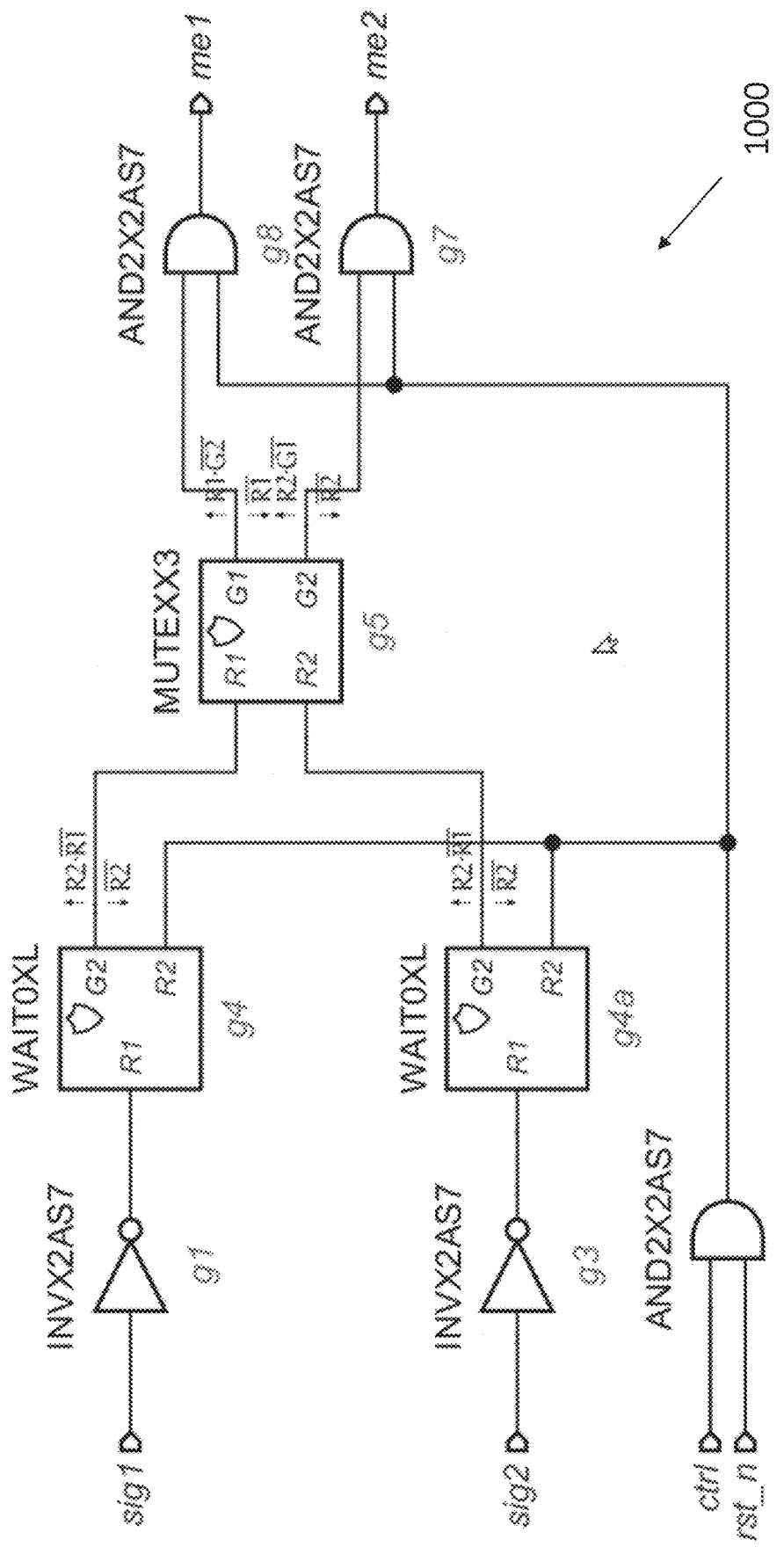
FIG. 10 is an exemplary implementation of a two-way arbiter.

FIG. 10 is an exemplary implementation of a two-way arbiter. The arbiter 1000 includes three MUTEX cells labelled g4, g4*a* and g5. The first MUTEX cell g4 receives a signal sig1 via inverter g1. The second MUTEX cell g3 receives a signal sig2 via inverter g3. The third MUTEX cell g5 receives G2 outputs of g4 and g4*a* respectively. Three AND gates are also provided labelled g0, g8 and g7. The end gate g0 receives a control signal "ctrl" and a reset signal "rst_n". The end gate g8 receives the output G1 of g5 and the output of g0, and provides the signal me1. Similarly, the end gate g7 receives the output G2 of g5 and the output of g0, and provides the output me2.

The function of the 2-way arbiter above is that when the ctrl input goes high, both Mutex elements g4 and g4*a* have R2 set. When sig1 or sig2 happens, the respective mutex will assert its G2 which will go to g5's R1 and R2 inputs respectively. The g5 element determines the winner (which one occurred first). It will assert G1 or G2 which through g7 and g8 will assert mutually exclusive outputs me1 or me2. Whichever one gets set will be guaranteed to remain set until such time that the ctrl signal (similar to go signal in a simple persistence latch). This assures that the signal seen by the circuit synthesized from the STG of FIG. 9 will only see persistent inputs.

Figure 11:
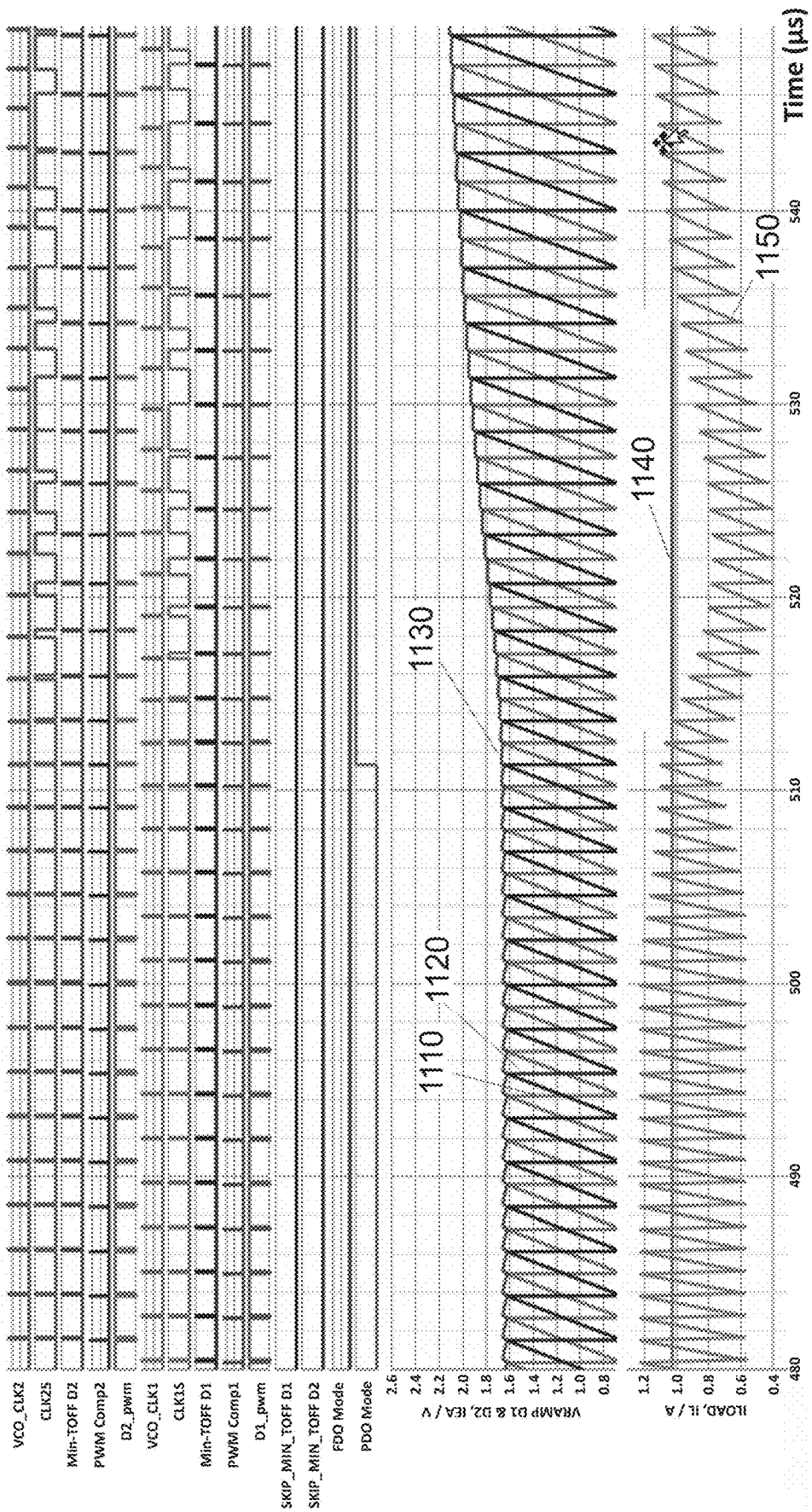
FIG. 11 is a waveform diagram illustrating the operation of a PDO controller as shown in FIG. 3C.

FIG. 11 is a waveform diagram illustrating the operation of a PDO controller also referred to as PDO module as shown in FIG. 3C. The operation is provided for one inductor phase, but two (180 degree) ramp phases, as shown in FIG. 3A. FIG. 11 shows the following signals:

The buck clock signals, "VCO_clk1" and "VCO_clk2" generated by clock 110 for the high side and low side respectively.

The stretched clock signals "clk1s" and "clk2s".

The PWM peak detect signals, "D1_pwm" and "D2_pwm" generated by the PWM comparators 120 and 125 for the high side and low side respectively. These signals correspond to "pwm_n_1_ph1" and "pwm_n_2_ph1" in FIG. 5.

The minimum toff signals "Min_toff_D1" and "Min_toff_D2".

The signals "PWM Comp1" and "PWM Comp2". PWM_Comp1 is the raw comparator output, which is inverted to make D1_pwm (pwn_n_1_ph1).

Also illustrated are the ramp signals ramp_1 1110 and ramp_2 1120 generated by the ramp generators 105 and 115 respectively, as well as the error amp voltage ERV_OUT 1130 from the error amplifier 130.

Also represented are the output or load current 1140 and the inductor current 1150.

As the error amp voltage ERV_OUT 1130 ascends, the ramps 1110 and 1120 get taller and taller resulting in wider cycles of the stretched clocks CLK1S and CLK2S, the falling edges of which define the new buck cycles.

Figure 12A:
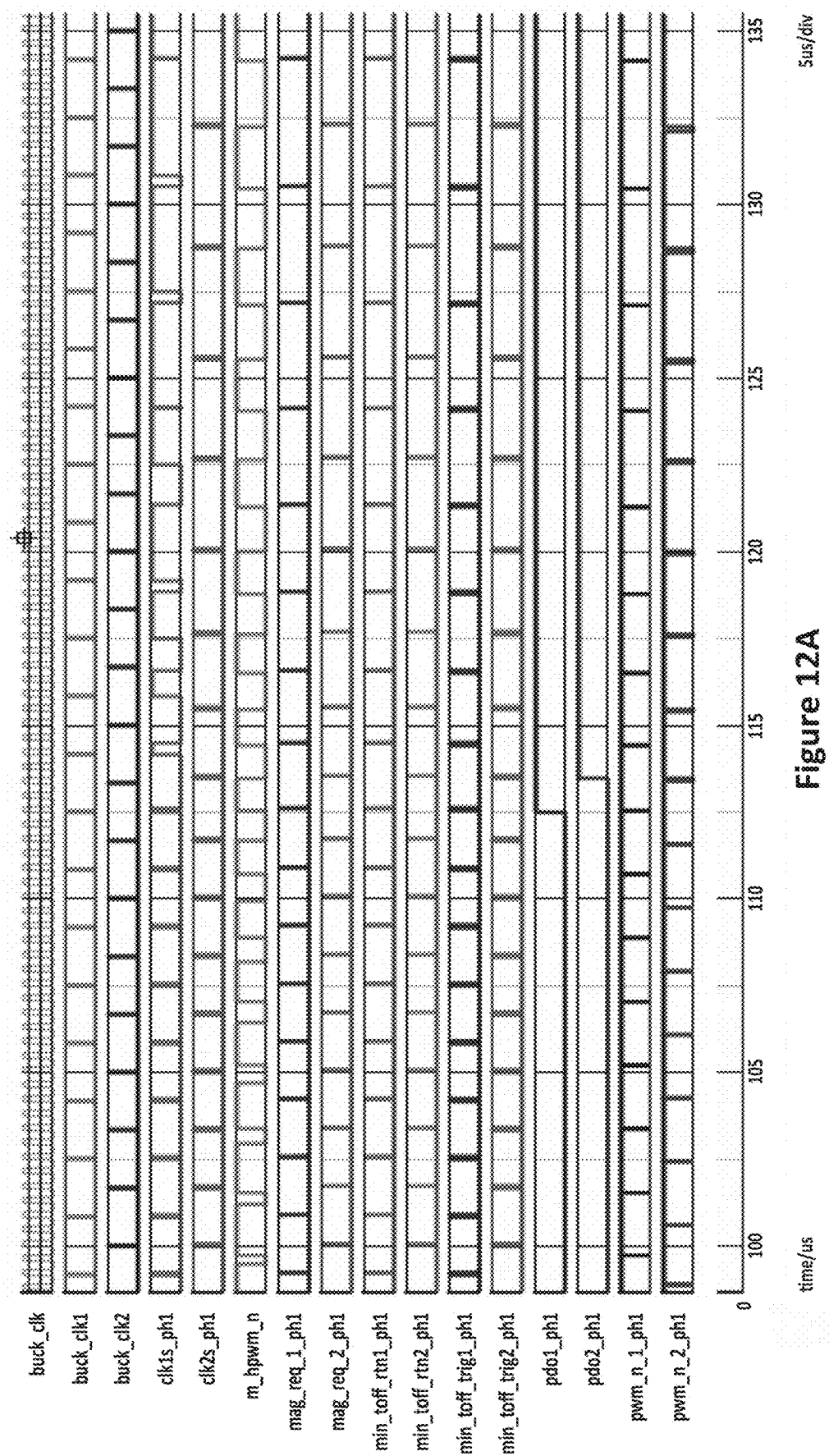
FIGS. 12A and 12B show a more detailed transition from PWM into PDO operation.
Figure 12B:
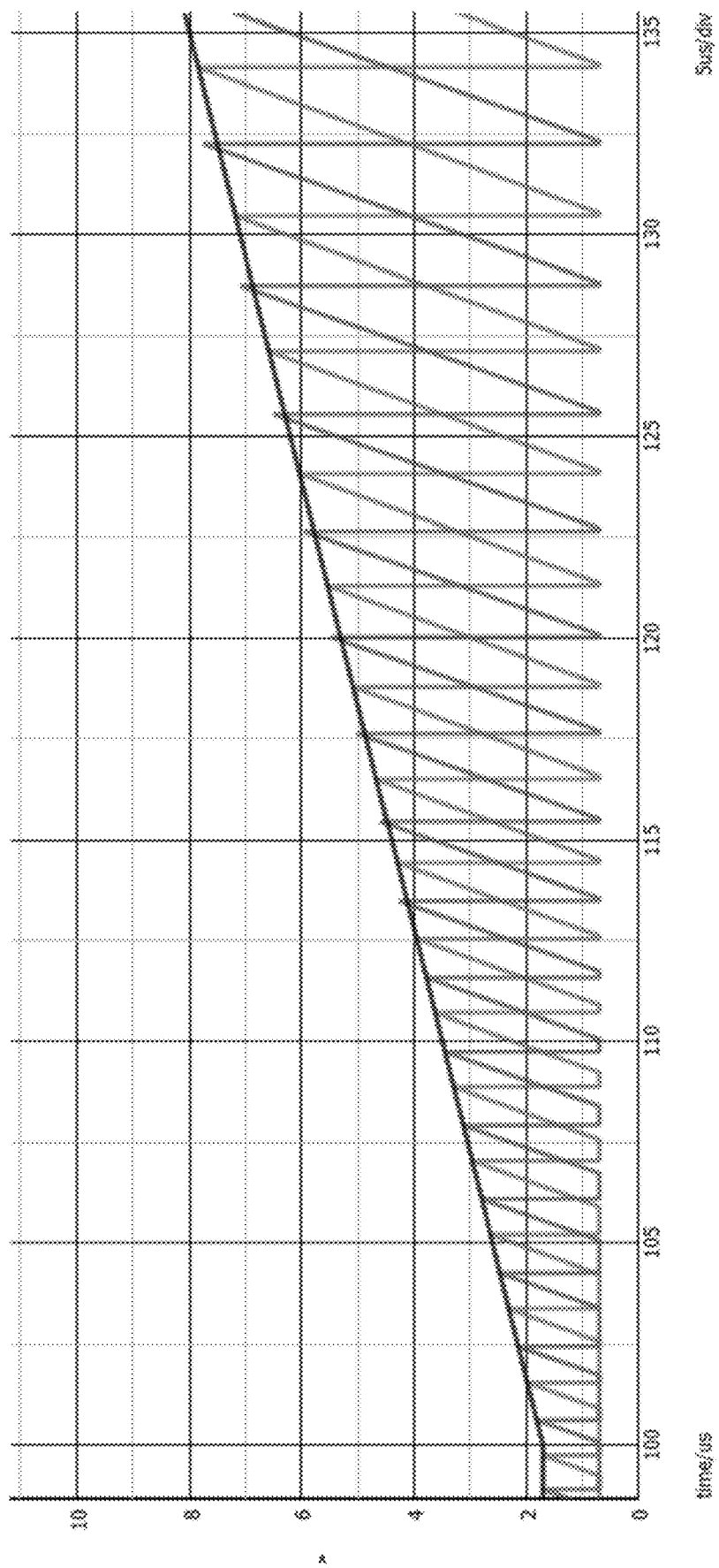

FIGS. 12A and 12B show a more detailed transition from PWM into PDO operation.

Figure 13A:
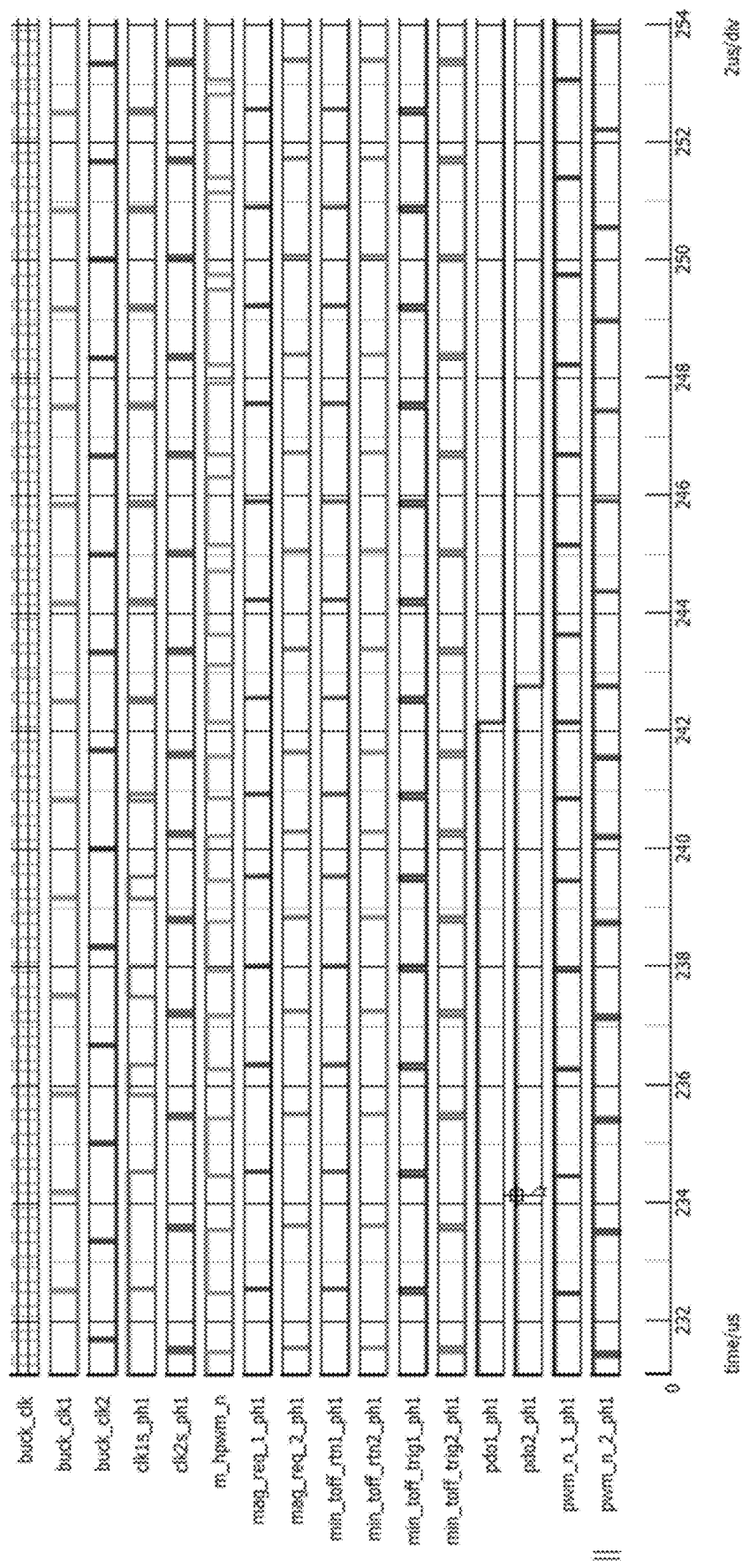
FIGS. 13A and 13B show a more detailed transition from PDO to PWM operation.
Figure 13B:
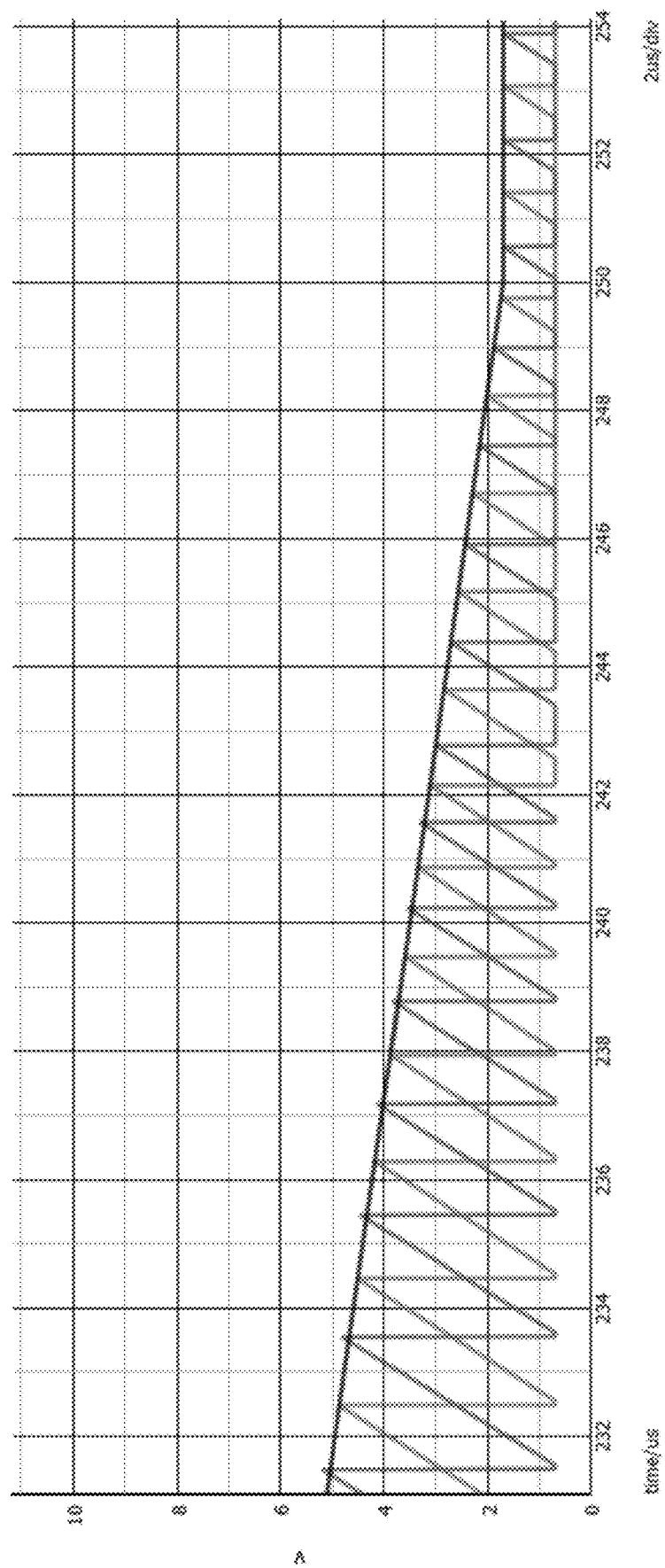

FIGS. 13A and 13B show a more detailed transition from PDO to PWM operation.

Figure 14A:
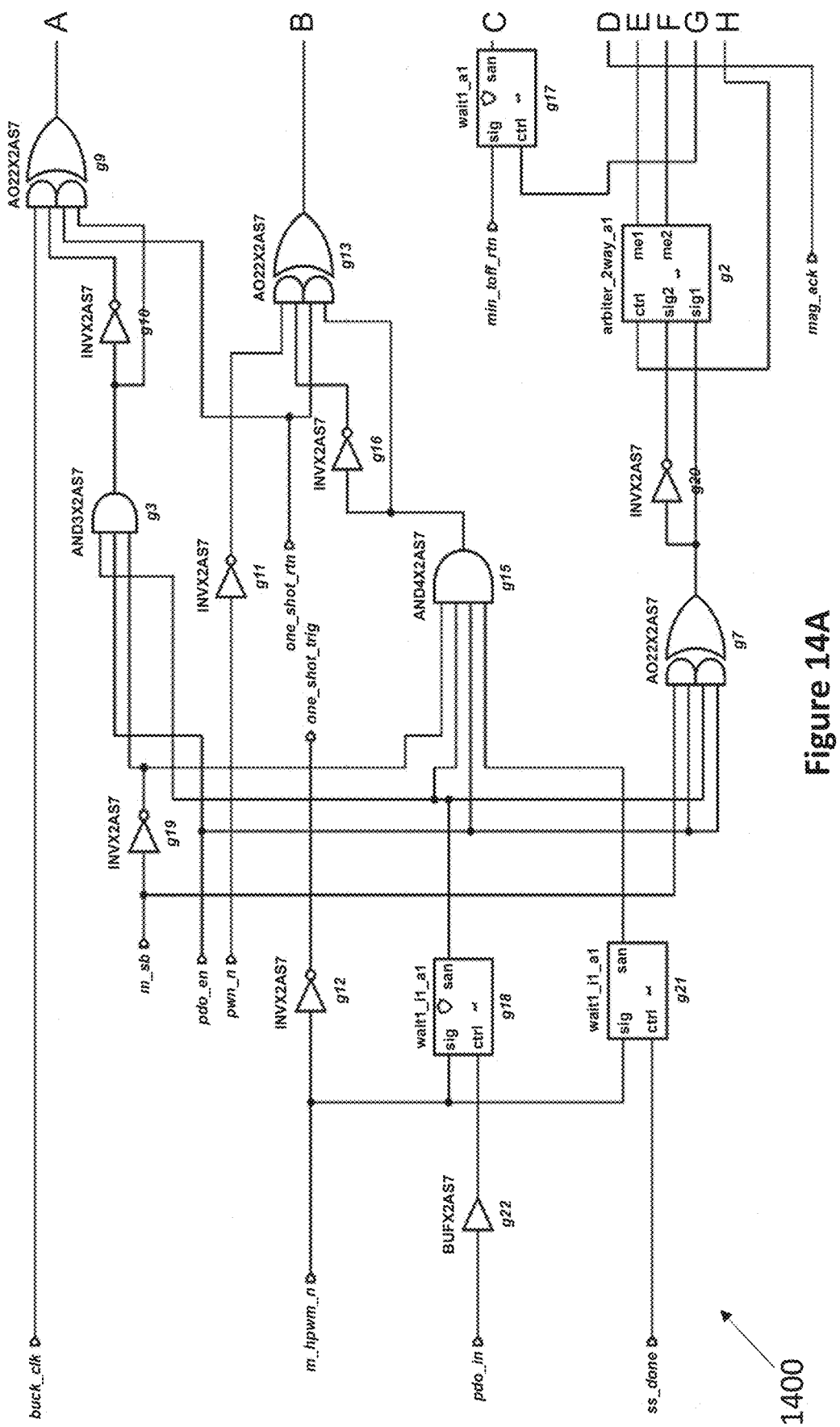
FIGS. 14A and 14B show an exemplary implementation of a sub PDO controller as used in the PDO controller of FIG. 3C.
Figure 14B:
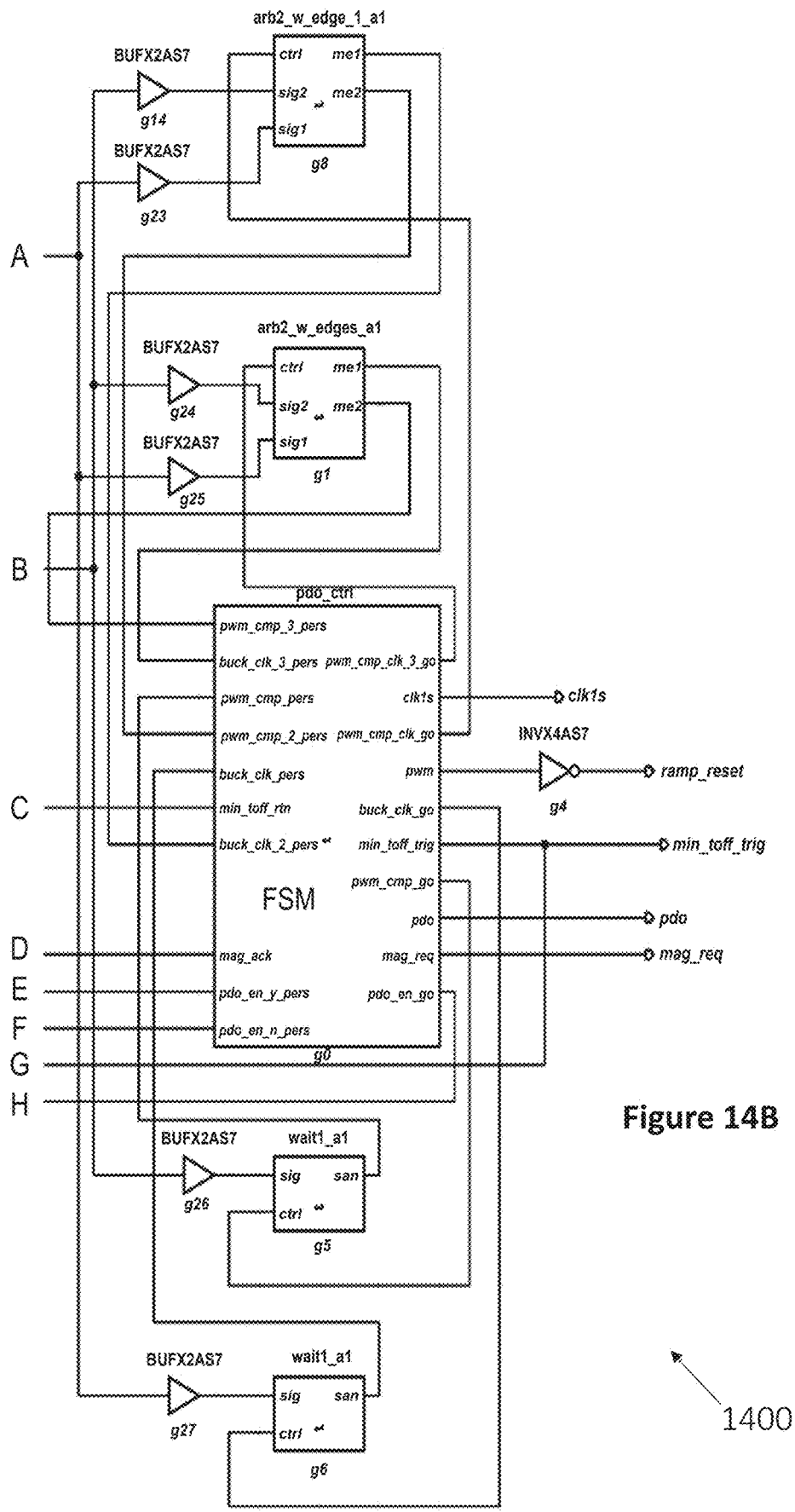

FIGS. 14A and 14B show an exemplary implementation of a sub PDO controller as used in the PDO controller of FIG. 3C. For clarity the diagram is split into two figures. The labels A, B . . . H indicate the connections between the elements of FIGS. 14A and 14B.

The main block labelled g0 of the PDO controller 1400, represents the finite state machine FSM (for instance 361*b* in FIG. 3C), while the other elements for the logic circuit (for instance logic circuit 361*a* in FIG. 3C). The block g0 is the FSM that implements the STG of FIG. 9. The rest of the logic is used to connect up and surround the block g0 with persistent signals. The logic circuit of the PDO controller or PDO module 1400 contains 3 signal multiplexers (g9, g13, g7) and 8 persistence latches that includes 5 wait cells (g5, g6, g17, g18, g21) and 3 two-way arbiters (g1, g2, g8).

The multiplexers are used to allow the PDO module to be a "master" or "slave". For example, in a two ramp system the first ramp can be the master and the second will act as a slave. This is enforced to assure that the channels stay in sync with each other and that both of them will operate in PDO or PWM without one of them being in one mode and the other being in the opposite mode.

To explain the operation of the PDO control block the outputs and inputs will first be defined.

Figure 15:
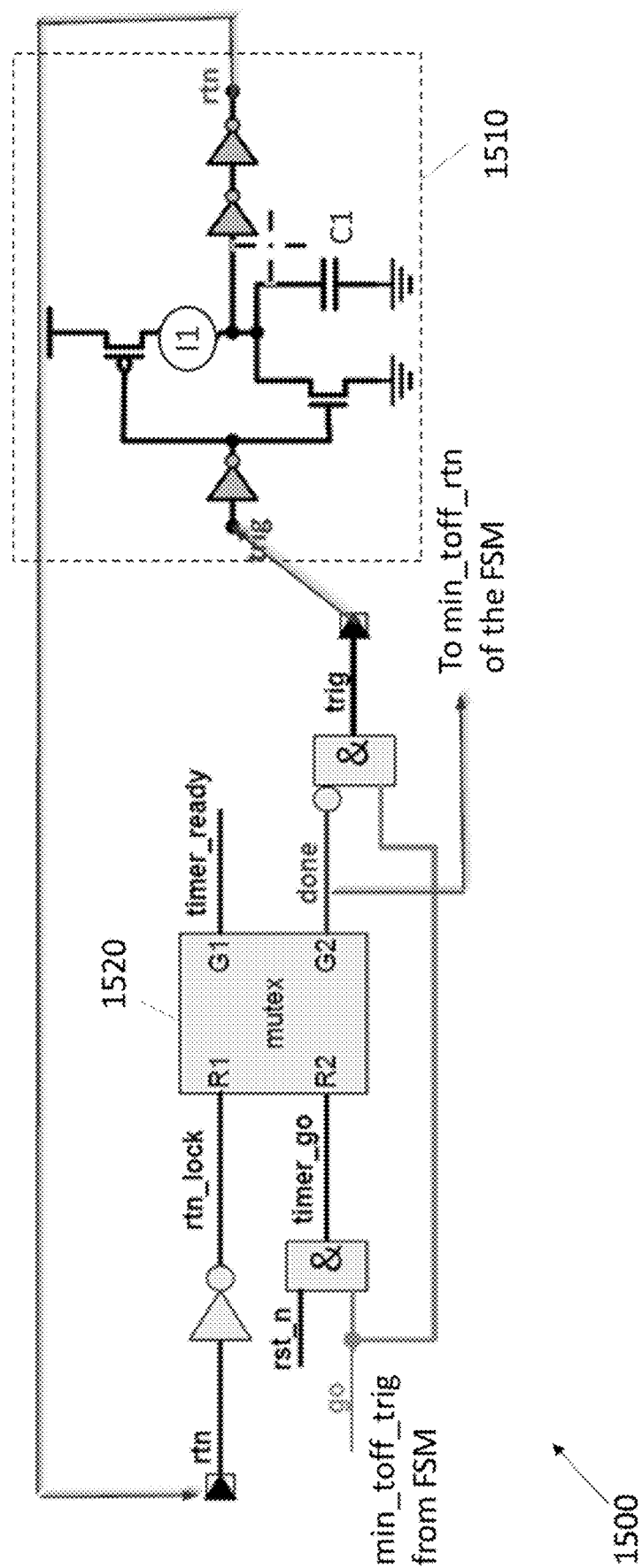
FIG. 15 is an example implementation of a minimum off-time timer.

The AFSM (block g0) provides five output signals that include:
i) clkls—this is the "stretched clock". In the design, this is mostly a debugging signal that is brought out but not used by any of the surrounding circuitry. One can observe this signal and see very well how the clock is being modified.
ii) ramp_reset—this signal is used to reset the ramp. It is generated from the pwm output of the STG circuit. When the ramp_reset is low, the ramp ascends when the PWM is true. The ramp reset to 0 when the PWM is not true. Looking at FIG. 5 for example, when ramp_reset_1_ph1 goes low, the ramp 520 begins to rise. When it gets reasserted true the ramp comes down again to the pedestal value.
iii) min_toff_trig—this is the trigger to a constant current on capacitor timer (I on C) based timer that is combined with a mutex element that will indicate through the min_toff_rtn signal (below in inputs) that the minimum off time has expired. The I on C timer is shown in FIG. 15.
iv) pdo-a signal that indicates that the STG has transitioned into pre-dropout mode; that is, the duty cycle has risen past the point where it can be accommodated without lengthening the cycle in order to maintain the required minimum off time.
v) mag_req-signal to the driver state machine 353 that the inductor magnetization is to begin.

In addition, the inverter g12 of the logic circuit provides another output signal labelled "one_shot_trig"-A signal that drives a one shot that creates a short pulse at the leading edge of the m_hpwm_n signal (input of g12). This is provided to make the comparator output appear more like the pwm_n signal that is only there momentarily. Its width determines how far the two ramps can be off from each other without causing issues.

The inputs signals include:
i) buck_clk—this is the main clock in the system and it defines the cycle boundaries when not in pre-dropout mode. The buck_clk is received by g9.
ii) m_sb-master/slave bar signal. When this is true the module is a master channel and has the ability to control the other channels. When it is false the module is a slave and will then take input on the pdo_in signal (described below). This feature is used to ensure that all the ramp phases are in the same mode at all times. The signal m_sb is received by g19 and g7.
iii) pdo_en-enable signal. When true, the system is allowed to go into pre-dropout mode to accomplish the needed duty cycle. If it is false, the system will not go into pre-dropout mode even if the error amp requests a duty cycle that exceeds what would be possible given the fixed cycle time and the minimum off time. The pdo_en signal is received by g3, g15, and g7.
iv) pwm_n—this is the inverted comparator output that tells the system that the ramp has exceeded the error amp input. The pwm_n signal is received by g11.
v) m_hpwm_n—this is a similar signal to pwm_n above, but it indicates that an alternate ramp has exceeded the error amp input. It can be used instead of pwm_n in cases where the channel is a slave and when in pre-drop out mode. The signal m_hpwm_n is received by g12, g18 and g21.
vi) pdo_in-signal that comes from the master pdo output to let the slave pdo know that the master is in pdo mode. For simplicity, even on the master this input should be driven from the pdo output of the same master. The pdo_in signal is received by g22.
vii) min_toff_rtn-works together with the output "min_t-off_trig" as an indicator to the block that the time has expired since the trigger occurred that is the minimum off time. The min_toff_rtn signal is received by g17.
viii) ss_done-soft start done. This signal is used to ensure that the slave channel terminates the magnetization when its own ramp exceeds the error amp input if in pre-dropout mode; where otherwise it would be using the m_hwpm_n signal. When the system is starting up, the error amps for some phases might not be well matched as the load sharing is not balanced yet. This signal is provided to the block so that it will tell the block when the load balancing for multiple inductor phases has occurred meaning that the error amps are likely balanced, and it is safe for the slave to use the alternate ramp input. The signal ss_done is received by g21.
ix) mag_ack—an input for the acknowledgement that the system has issued the inductor magnetization that was requested by the output signal "mag_req". The mag_ack signal is received by g0.
x) one_shot_rtn—the return from the one-shot trigger that was tripped from the "pdo_in" signal.

The PDO controller or PDO module contains 3 signal multiplexers (g9, g13, g7) and 8 persistence latches that includes 5 wait cells (g5, g6, g17, g18, g21) and 3 two-way arbiters (g1, g2, g8).

The g9 multiplexer is used to select the source of the buck clock. If the module is a master, then this is always the buck clock input. But if it is a slave AND if pdo_en is true AND if the pdo_in signal from the master is true, then in that case, the m_hpwm_n signal will serve as the buck clock so that the slave stays synchronized with the master during pre-dropout operation.

The g13 multiplexer is used to select the source of the peak detect signal which is used to terminate a magnetization. If the PDO module is a master, then the source of this signal will always be pwm_n. If it is a slave AND pdo_in is true indicating that the master is in PDO mode AND pdo_en is true AND ss_done has been seen, then the source of this signal is m_hpwm_n. Note that if m_hpwm_n is the clock and the peak comparison, it defines the pre-dropout magnetization by itself which keeps the slave lined up at some prescribed phase with the master.

The third multiplexer is g7 and it is used to construct the pdo_en_y and pdo_en_n signals for the g2 arbiter that is used as a sampler by the FMS g0 to determine whether it can go into the pdo part of the FSM.

The persistence latches (or sanitization registers as they are sometimes referred to) are as follows:

The wait cell g18 is used as a latch that samples pdo_in. It uses the m_hpwm_n signal as its clock. The wait cell g21 does the same sort of thing for the ss_done input. The above two wait cells do not clean up signals for the FSM g0 but they are used as latches in the outside logic. The wait cell g17 is used together with an I on C timer to sanitize the min_toff_rtn signal.

The STG of FIG. 9 and the circuit of FIG. 14 represent one possible embodiment of a PDO controller. It will be appreciated that different designs could be envisaged.

For a simple buck, a single sub PCO controller would be used. For a converter circuit as shown in FIG. 3A, two PDO sub controllers are used as shown in FIG. 3C. Other converters with more inductor phases could be envisaged. For instance, a converter having two inductor phases both of which are multi-levels (MLC) would require 4 sub PDO converters; that is 1 master and 3 slaves.

FIG. 15 shows an example implementation of the minimum off-time timer 122 of FIG. 3A. In this example the timer 122 is provided by an I on C timer constructed using the wait cell.

The FSM issues the min_toff_trig signal which is received by the AND gate in FIG. 15 and shown as "go signal". This enables the "trig" signal provided to the I on C timer 1510. In turn this allows a current to flow into the capacitor C1 hence causing the voltage on the capacitor to ramp up. When it exceeds the gate threshold (a comparator may be used for accuracy) then the "rtn" signal will go to the mutex cell 1520 through the inverter and cause the "done" signal to assert high. This will turn off the charging of the capacitor C1 and will discharge it. The switched constant current source I1 is used to create a linear ramp on the capacitor C1. The rtn output signal can glitch, but the mutex 1520 will cause the "done" signal not to glitch and it will remain true until the "go" signal goes away. The "go" signal will not de-assert until the "done" signal which is connected to the FSM min_toff_rtn signal has been seen; thereby establishing the required causal acknowledgement.

The two way arbiter g2 is being as a sampler in that the true and complimented values of the same signal are applied to its two sig inputs. Therefore, when ctrl is asserted, either me1 or me2 will assert and those outputs are connected to the pdo_en_y_pers (persistent yes) and the pdo_en_n_pers (persistent no) inputs to the FSM g0. Every time the FSM traverses the signal loop if it wants to go to pre-dropout mode, it will sample this arbiter to determine if it can go there or not.

The 2 way arbiter g8 determines whether the buck clock or the pwm comparator trip occurs first. This corresponds to state 7 in the STG of FIG. 9B (as well as the flow diagram of FIG. 4). The FSM uses this to determine whether or not it wants to try to go into pre-drop out mode. If the clock comes first, it indicates that a higher duty cycle is needed than can be provided in the fixed cycle time with the fixed min_toff requirement.

The two way arbiter g1 determines again whether the buck clock or the pwm comparator trip occurs first. This corresponds to state 15 of the STG in FIG. 9B. In this state we are determining whether to stay in pre-dropout mode or are exiting back to PWM mode. If the comparator trips first then we are leaving pre-dropout mode but if the clock occurs first, then we will stay in pre-dropout mode.

The wait cell g5 is observing the pwm_n signal (or its substitute in slave mode). It corresponds to state 10 of the STG of FIG. 9C (as well as the flow diagram of FIG. 4).

The Wait cell g6 is observing the buck clock (or its substitute in slave mode). It corresponds to state 1 of the STG of FIG. 9A (as well as the flow diagram of FIG. 4).

Figure 16A:
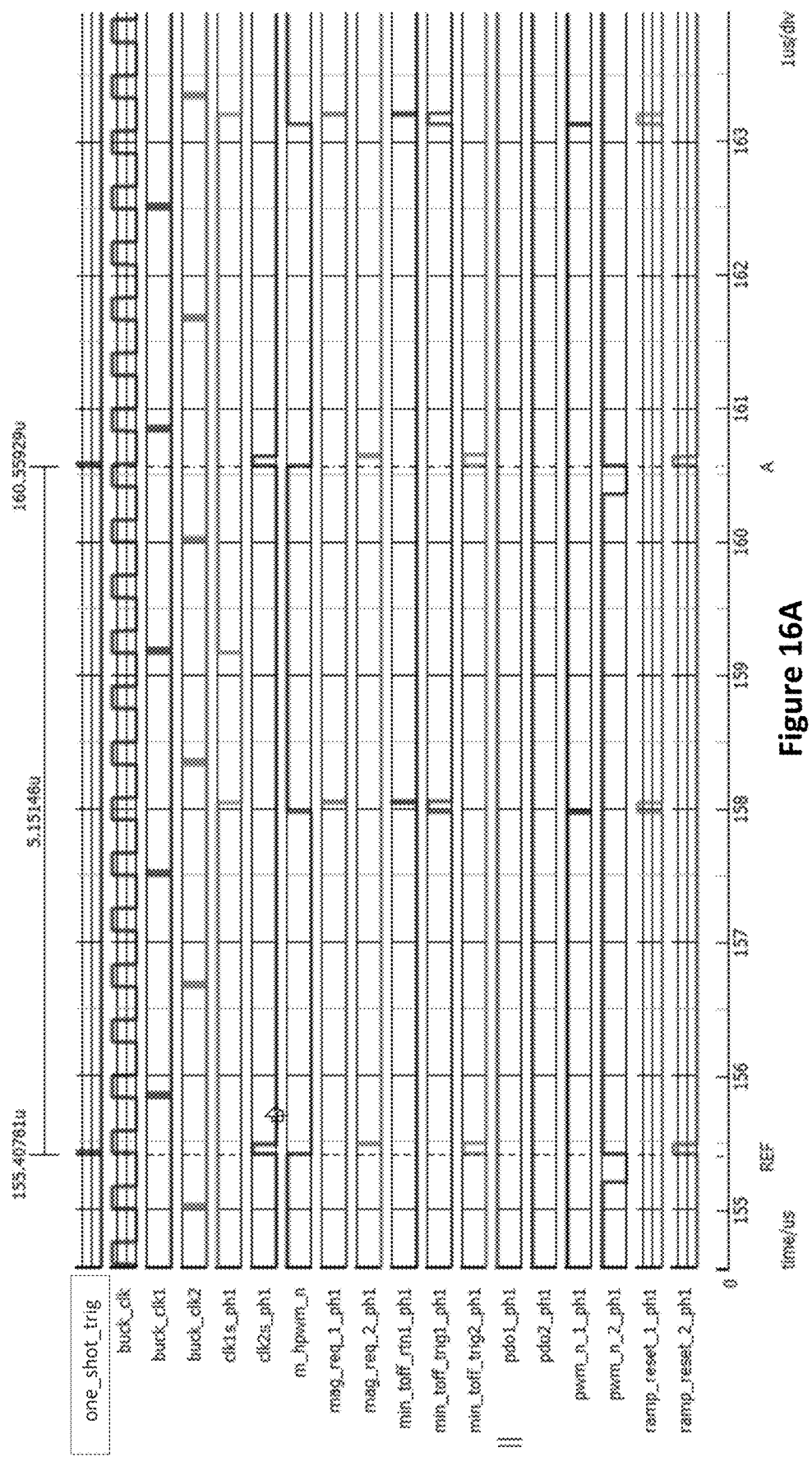
FIGS. 16A and 16B illustrate the operation of a PDO controller with two synchronized ramps.
Figure 16B:
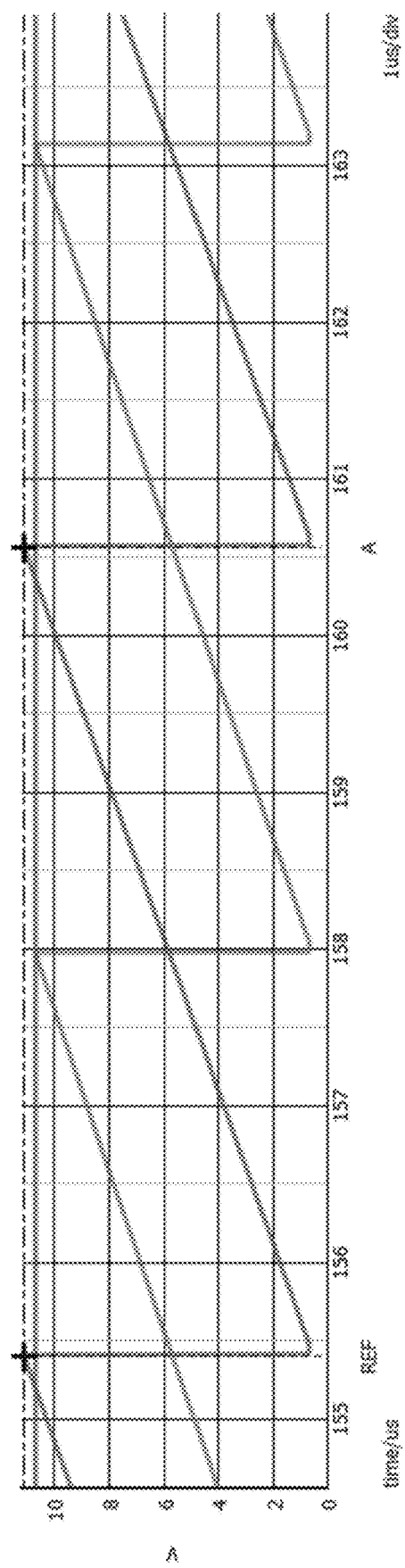

FIGS. 16A and 16B illustrate the operation of a PDO controller with two synchronized ramps.

FIG. 16A shows the logic signal "m_hwpm_n" as one of the input signals received by the logic circuit of FIG. 14A (see g12, g18 and g21). The falling edge of the m_hwpm_n signal causes the "one_shot_trig" signal (output of g12). In the PDO mode, this acts as a buck clock for the slave so that the slave will stay synchronized 180 degrees out of phase. The "m_hpwm_n" signal is a comparator output that has its threshold at ½ the value of the error amp output, so that at the midpoint of the duty cycle, this will be the start of the second channel ramp. This should by nature align with when the second ramp is hitting its peak. But there can be a finite difference in the ramp rates. The one shot is created to be wide enough so that these two events will overlap. This same capability can be used for additional channels. For example, with 4 ramps, there might be a ½, ¼, and ¾ error amp signal based on channel 1's ramp for channels 2, 3, and 4 respectively.

Figure 17:
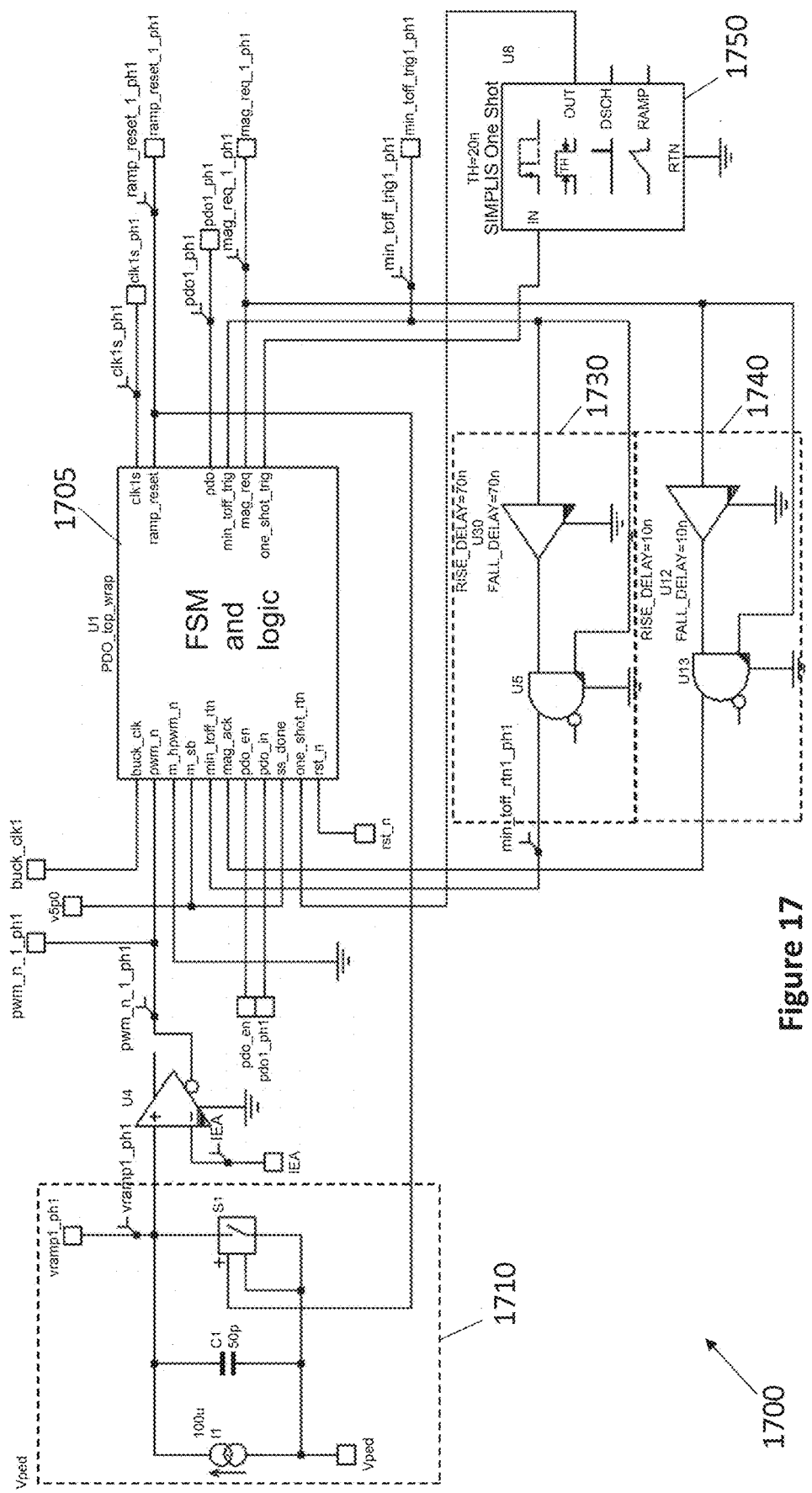
FIG. 17 is a diagram of a PDO controller implemented as a master controller.

FIG. 17 is a diagram of a PDO controller 1700 implemented as a master controller. The PDO controller 1700 includes an FSM and logic 1705, an I on C timer 1710, two delay modules 1730 and 1740, and a one shot trigger 1750. The FSM and logic 1705 may be implemented as described in FIGS. 14A and 14B. The signal called pdo1_ph1 on the right side of 1705 is also fed back into the pdo_in signal on the left side of 1705. The I on C analog timer 1710 receives the "ramp_reset" signal from the FSM and logic 1705, which acts as a master. The main ramp generator includes the current source I1, the capacitor C1, and the comparator U4. The comparator U4 has an inverting input that receives the error amp output labelled IEA, and a non-inverting input that receives vramp1_ph1 (output of the I on C timer). The comparator U4 compares the signal vramp1_ph1 to the signal IEA to provide the raw trip output pwm_r1_ph1 which goes into pwm_n input of the FSM 1705.

The min_toff timer 1730 is modelled with the delay U30 and the AND gate U5. The AND gate U5 receives the "min_toff_trig" signal from the FSM at one input and a delayed version of the "min_toff_trig" signal at the other input. The output of the AND gate U5 is the "min_toff_rtn" received by the FSM.

Another delay module 1740 is provided by delay U12 and AND gate U13. The delay module 1740 is used to model the response time from a "mag_req".

The AND gate U13 receives the "mag_req" signal from the FSM at one input and a delayed version of the "mag_req" signal at the other input. The output of the AND gate U13 is the "mag_ack" received by the FSM.

There is also a one shot trigger U8 1750 that is used by the PDO module in order to ensure that the m_hpwm_n signal will be seen so long as the ramps are balanced within limits to one another. The m_hpwm_n signal is tied low in FIG. 17 since it is a master channel that does not use it. The one shot is used to make sure that the system responds to the leading edge of the out of phase comparator in pre-dropout mode. It should be wide enough to compensate for the mismatch between the ramps. It should also be wide enough such that it will still be captured if one channel is within limits but slower or faster than the other.

The main difference between a master PDO controller as shown in FIG. 17 and a slave PDO controller would be that the "m_sb" signal would be set low and the "m_hpwm_n" would be connected to a comparator the threshold of which is set for example by ½ the error amp voltage so that it would trip at 180 degrees of phase out when in pre_dropout mode. The slave operation defined here is also seen in FIG. 17 where the operation of the extra ramp comparator threshold "m_hpwm_n" signal is used to keep the ramps synchronized with the proper phase with respect to the defined master.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A step-down converter configured to receive an input voltage and provide an output voltage, the step-down converter comprising:
   a power stage having at least one phase, each phase comprising an inductor;
   a driver configured to drive the power stage in a synchronous mode or in an asynchronous mode of operation with a minimum off-time; wherein when the output voltage approaches the input voltage, a duty cycle of the converter increases up to a value limited by the minimum off-time; and
   a clock source configured to generate a first clock signal having a predefined pulse width;
   wherein the driver is configured to generate a first stretchable clock signal having an adjustable pulse width and an adjustable period; and
   wherein upon transition from the synchronous mode to the asynchronous mode the driver is configured to increase the adjustable pulse width and the period of the first stretchable clock signal.

2. The step-down converter as claimed in claim 1, wherein the driver comprises a first state machine configured to generate the first stretchable clock signal and adjust the pulse width and period of the first stretchable clock signal.

3. The step-down converter as claimed in claim 2, comprising:
   a first ramp generator configured to generate a first ramp signal responsive to the first clock signal; and
   an error comparator configured to generate an error signal by comparing the output voltage with a reference voltage,
   wherein the pulse width of the stretchable clock signal increases as the error signal increases up to a limit value.

4. The step-down converter as claimed in claim 3, comprising a first comparator configured to compare the first ramp signal with the error signal, and wherein when the first ramp signal increases to become equal to the error signal the comparator trips and its output goes high.

5. The step-down converter as claimed in claim 4, wherein if the first clock signal occurs before the comparator trip event, then the converter transits to the asynchronous mode, otherwise the converter remains in the synchronous mode.

6. The step-down converter as claimed in claim 2, wherein the first state machine is configured to generate a first ramp reset signal to reset a first ramp signal; a first asynchronous mode signal indicating that the converter has transitioned into asynchronous mode; a first minimum off-time trigger signal configured to trigger a start of a timer; and a first magnetization request signal configured to start inductor magnetization after completion of the timer.

7. The step-down converter as claimed in claim 2, comprising a first logic circuit coupled to the first state machine.

8. The step-down converter as claimed in claim 7, wherein the first logic circuit comprises a plurality of persistence latches.

9. The step-down converter as claimed in claim 7, comprising a second state machine coupled to a second logic circuit; the second state machine being configured to generate a second stretchable clock signal having an adjustable pulse width and an adjustable period.

10. The step-down converter as claimed in claim 9, wherein the first logic circuit and the second logic circuit are configured to receive a logic signal for setting the state machine as a master or as a slave, such that when the first state machine is a master, the second state machine is a slave, and conversely when the first state machine is a slave, the second state machine is a master.

11. The step-down converter as claimed in claim 9, comprising a second ramp generator; wherein the second state machine is configured to generate a second ramp reset signal to reset the second ramp signal.

12. The step-down converter as claimed in claim 9, wherein the second state machine is configured to generate a second asynchronous mode signal indicating that the converter has transitioned into asynchronous mode; a second minimum off-time trigger signal configured to trigger a start of a timer; and a second magnetization request signal configured to start inductor magnetization after completion of the timer.

13. The step-down converter as claimed in claim 1, wherein the first clock signal and the first stretchable clock signal are in phase.

14. The step-down converter as claimed in claim 1, comprising a minimum off-time timer configured to start upon receipt of a trigger signal.

15. A method of controlling a step-down converter configured to receive an input voltage and provide an output voltage, the method comprising
   providing a driver configured to drive a power stage of the converter in a synchronous mode or in an asynchronous mode of operation with a minimum off-time; wherein when the output voltage approaches the input voltage, a duty cycle of the converter increases up to a value limited by the minimum off-time;

generating a first clock signal having a predefined pulse width;

generating a first stretchable clock signal having an adjustable pulse width and an adjustable period; and upon transition from the synchronous mode to the asynchronous mode, increasing the adjustable pulse width and the adjustable period of the stretchable clock signal.

16. The method as claimed in claim 15, comprising:

generating a first ramp signal responsive to the first clock signal; and generating an error signal by comparing the output voltage with a reference voltage;

wherein the pulse width of the stretchable clock signal increases as the error signal increases up to a limit value.

17. The method as claimed in claim 15, comprising generating an enabling signal to enable a transition between the synchronous mode of operation to the asynchronous mode of operation.

18. The method as claimed in claim 15, comprising generating a magnetization request signal to magnetize the inductor.

19. The method as claimed in claim 15, wherein a magnetization of the inductor is caused by expiry of a minimum off-time timer.

20. A controller for use with a step-down converter, the controller comprising:

a driver configured to drive a power stage of the converter in a synchronous mode or in an asynchronous mode of operation with a minimum off-time; wherein when the output voltage approaches the input voltage, a duty cycle of the converter increases up to a value limited by the minimum off-time; and a clock source configured to generate a first clock signal having a predefined pulse width;

wherein the driver is configured to generate a first stretchable clock signal having an adjustable pulse width and an adjustable period; and wherein upon transition from the synchronous mode to the asynchronous mode the driver is configured to increase the adjustable pulse width and the period of the first stretchable clock signal.

\* \* \* \* \*